United States Patent
McCormick

(10) Patent No.: US 9,820,101 B2
(45) Date of Patent: Nov. 14, 2017

(54) DEVICE TRACKING SYSTEM

(71) Applicant: Thinking Source, LLC, Boulder, CO (US)

(72) Inventor: Michael McCormick, Boulder, CO (US)

(73) Assignee: Thinking Source, LLC, Boulder, CO (US)

( * ) Notice: Subject to any disclaimer, the term of this patent is extended or adjusted under 35 U.S.C. 154(b) by 0 days.

(21) Appl. No.: 15/200,987

(22) Filed: Jul. 1, 2016

(65) Prior Publication Data
US 2017/0064511 A1 Mar. 2, 2017

Related U.S. Application Data

(60) Provisional application No. 62/209,281, filed on Aug. 24, 2015.

(51) Int. Cl.
*H04W 4/02* (2009.01)
*H04W 4/00* (2009.01)
(Continued)

(52) U.S. Cl.
CPC .......... *H04W 4/025* (2013.01); *G06Q 20/102* (2013.01); *H04B 17/318* (2015.01);
(Continued)

(58) Field of Classification Search
CPC ..... H04W 4/003; H04W 4/008; H04W 4/025; H04W 24/10; H04B 17/318; H04L 41/22; G06Q 20/102
(Continued)

(56) References Cited

U.S. PATENT DOCUMENTS 5,889,492 A * 3/1999 Kurby ................... G01S 5/0027
342/357.52
2004/0203927 A1* 10/2004 Kraft ..................... H04W 8/08
455/456.2

(Continued)

OTHER PUBLICATIONS

CHIPOLO, "CHIPOLO: Always know where your things are", Retrieved from https://chipolo.net/, Known to exist as early as Jul. 15, 2016, p. 7.
(Continued)

*Primary Examiner* — Michael Mapa
(74) *Attorney, Agent, or Firm* — Neugeboren O'Dowd PC

(57) ABSTRACT

System and methods for locating radio-frequency-emitting devices are provided. The method may comprise registering, on a downloadable software application on a first locator device, a trackable device, wherein the registered trackable device emits a radio frequency signal, then detecting, via a radio frequency scan conducted by a second locator device, a sighting of the registered trackable device. The method may then comprise determining, at the second locator device, whether the sighting of the registered trackable device meets criteria defining the sighting as a new location of that registered trackable device, wherein the criteria are configurable on a software application located on a server. Further, the method may include communicating a report of the new location and geographical location to the server, sending a notification from the server to the first locator device that a new location has occurred, and presenting the geographical location of the registered trackable device.

17 Claims, 16 Drawing Sheets

(51) Int. Cl.
*H04W 24/10* (2009.01)
*G06Q 20/10* (2012.01)
*H04L 12/24* (2006.01)
*H04B 17/318* (2015.01)

(52) U.S. Cl.
CPC ............. *H04L 41/22* (2013.01); *H04W 4/003* (2013.01); *H04W 4/008* (2013.01); *H04W 24/10* (2013.01)

(58) Field of Classification Search
USPC .............................................. 455/456.1–457
See application file for complete search history.

(56) References Cited

U.S. PATENT DOCUMENTS

| | | | |
|---|---|---|---|
| 2006/0009240 A1* | 1/2006 | Katz | G01S 5/0289 455/457 |
| 2006/0211415 A1* | 9/2006 | Cassett | H04W 24/04 455/423 |
| 2013/0157569 A1* | 6/2013 | Torvmark | H04W 4/008 455/41.2 |
| 2014/0213301 A1* | 7/2014 | Evans | H04W 4/023 455/456.3 |
| 2016/0142876 A1* | 5/2016 | Klein | G01C 21/005 455/456.2 |

OTHER PUBLICATIONS

Pebblebee, "PebbleBee Website", Retreived from https://pebblebee.com/, Known to exist as early as Jul. 15, 2016, p. 5.

Tile, Inc., "Tile: Never lose anything again.", Retreived from https://www.thetileapp.com/how-it-works, Known to exist as early as Jul. 15, 2016, p. 10.

TrackR, "TrackR: Find Lost Items in Seconds", Retreived from https://www.thetrackr.com/, Known to exist as early as Jul. 15, 2016, p. 10.

* cited by examiner

DEVICE TRACKING SYSTEM

CLAIM OF PRIORITY UNDER 35 U.S.C. §119

The present application for Patent claims priority to Provisional Application No. 62/209,281 entitled "DEVICE TRACKING SYSTEM" filed Aug. 24, 2015, and assigned to the assignee hereof and hereby expressly incorporated by reference herein.

FIELD OF THE DISCLOSURE

The present disclosure relates to systems, methods, and apparatuses for tracking devices. In particular, but without limitation, the present disclosure relates to using applications on computing devices to track the location of tracker devices that emit detectable radio signals.

BACKGROUND

Many companies produce tracking devices that have the ability to emit Bluetooth Low Energy (BLE) signals ("tracker devices"). These tracker devices are usually small pieces of hardware that may be affixed to larger objects to allow them to be detected by computing devices equipped with radio scanners, and particularly ones that have BLE radios (e.g., smartphones). Personal devices to which tracker devices may be affixed commonly include keys, phones, wallets, purses, water bottles, tablet computers, or any other personal devices a user risks misplacing or losing that they wish to keep track of. Enterprises can also use tracker devices to locate company assets, such as tools, movable equipment, vehicles, computing devices, or any other valuable resources.

The companies that produce tracker devices often have proprietary hardware that pairs with a proprietary computing device application (e.g., a smartphone application), in order to scan for one or more of the proprietary tracker devices when they are in scanning range of a smartphone, which is typically between 30 to 100 feet. Additionally, many of the applications include a function known as "crowd-source location," which enables a user to locate their tracker devices that are lost or otherwise outside the range of the user's own smartphone. This crowd-source location function works by utilizing the smartphone applications of other users who also own the same brand of proprietary hardware. For example, a company called ABC Tracker may make a BLE hardware tracking device (ABC Tracker Device) and a corresponding tracking application (ABC Tracker App). User A may have her ABC Tracker device attached to her wallet, which she loses at a restaurant. If User B, who also owns at least one ABC Tracker device and has the ABC Tracker App, happens to be in that restaurant, User B's smartphone could detect the presence of User A's wallet and allow User A to see (on her ABC Tracker App) that her wallet has been found by User B. In order for some crowd-source location systems to work, the owner of the lost device typically must designate a particular item as "lost" through an application interface. Other users of the app typically must have the app running, at least in the background, and have the app set to a permission setting that allows it to detect others' lost items. The information from each user's app is usually sent to a cloud service that relays the information received at the "finder's" smartphone to the user who lost the item.

With the proliferation of companies that make tracking devices and applications, and the increase in the number of users and number of individual devices that each individual user tracks, a number of improvements to the functionality of crowd-source location are desired. Several challenges exist in terms of widespread adoption, reliability of information, accuracy of scanning, and resource utilization, to name a few.

SUMMARY

One aspect of the disclosure provides a system for locating radio-frequency-emitting devices. The system may comprise a first software application on a locator device, which itself may comprise a radio-frequency scanning component, and a data utilities component. The system may further comprise a second software application that is downloadable on a personal communication device, the second software application itself comprising the radio-frequency scanning component, the data utilities component, and a user interface. The system may further comprise a third software application located on server remote from the locator device and the personal communication device. The system may be configured to allow a user of the second software application to register a radio-frequency emitting device, thereby creating a registered trackable device, detect the registered trackable device by the radio-frequency scanning component at either the first or second software application, wherein any instance of detecting constitutes a sighting of the registered trackable device, and determine if the sighting meets criteria defining the sighting as a new location of that registered trackable device utilizing the data utilities component locally at either the first or second software application. Then the system may further communicate, if the sighting of the registered trackable device meets the criteria, a report of the new location to a server, the report including the geographical location of the registered trackable device, wherein the criteria defining the sighting as the new location is configurable at the third software application on the remote server.

Another aspect of the disclosure may comprise a method for locating radio-frequency-emitting devices. The method may comprise registering, on a downloadable software application on a first locator device, a trackable device, thereby creating a registered trackable device, wherein the registered trackable device emits a radio frequency signal, then detecting, via a radio frequency scan conducted by a second locator device, a sighting of the registered trackable device. The method may then comprise determining, at the second locator device, whether the sighting of the registered trackable device meets criteria defining the sighting as a new location of that registered trackable device, wherein the criteria are configurable on a software application located on a remote server. Further, the method may include communicating, if the sighting of the registered trackable device meets the criteria, a report of the new location to the server, the report including the geographical location of the registered trackable device, sending a notification from the server to the first locator device that a new location of the registered trackable device has occurred, and presenting, to a user of the first locator device the geographical location of the registered trackable device.

Yet another aspect of the disclosure provides a non-transitory, tangible computer readable storage medium, encoded with processor readable instructions to perform a method for locating radio-frequency-emitting devices. The method may comprise registering, on a downloadable software application on a first locator device, a trackable device, thereby creating a registered trackable device, wherein the registered trackable device emits a radio frequency signal, then detecting, via a radio frequency scan conducted by a second locator device, a sighting of the registered trackable device. The method may then comprise determining, at the second locator device, whether the sighting of the registered trackable device meets criteria defining the sighting as a new location of that registered trackable device, wherein the criteria are configurable on a software application located on a remote server. Further, the method may include communicating, if the sighting of the registered trackable device meets the criteria, a report of the new location to the server, the report including the geographical location of the registered trackable device, sending a notification from the server to the first locator device that a new location of the registered trackable device has occurred, and presenting, to a user of the first locator device the geographical location of the registered trackable device.

DETAILED DESCRIPTION

The present disclosure provides systems, methods, and apparatuses that enable users of hardware tracking devices to locate them reliably and precisely, even when the hardware devices are out of range of the registered owner. Throughout the disclosure, reference will be made to hardware, software, and firmware that utilizes the BLE communication protocol standard. However, it is contemplated that aspects of the present disclosure may also apply to other communication protocols, including other currently existing ones and others yet to be developed. Currently, many other short-range, low-power communication protocols exist, including Zigbee, NFC, and RFID, though at the time of this application, BLE is the most commonly used protocol for applications described herein. Because of the rapidly changing nature of communication protocol standards, it is contemplated that future versions of the BLE standard itself, as well as other short-range, low-power communication protocols may be used with aspects of the disclosure, and references to BLE as it currently exists should not be construed to limit the present disclosure.

Figure 1:
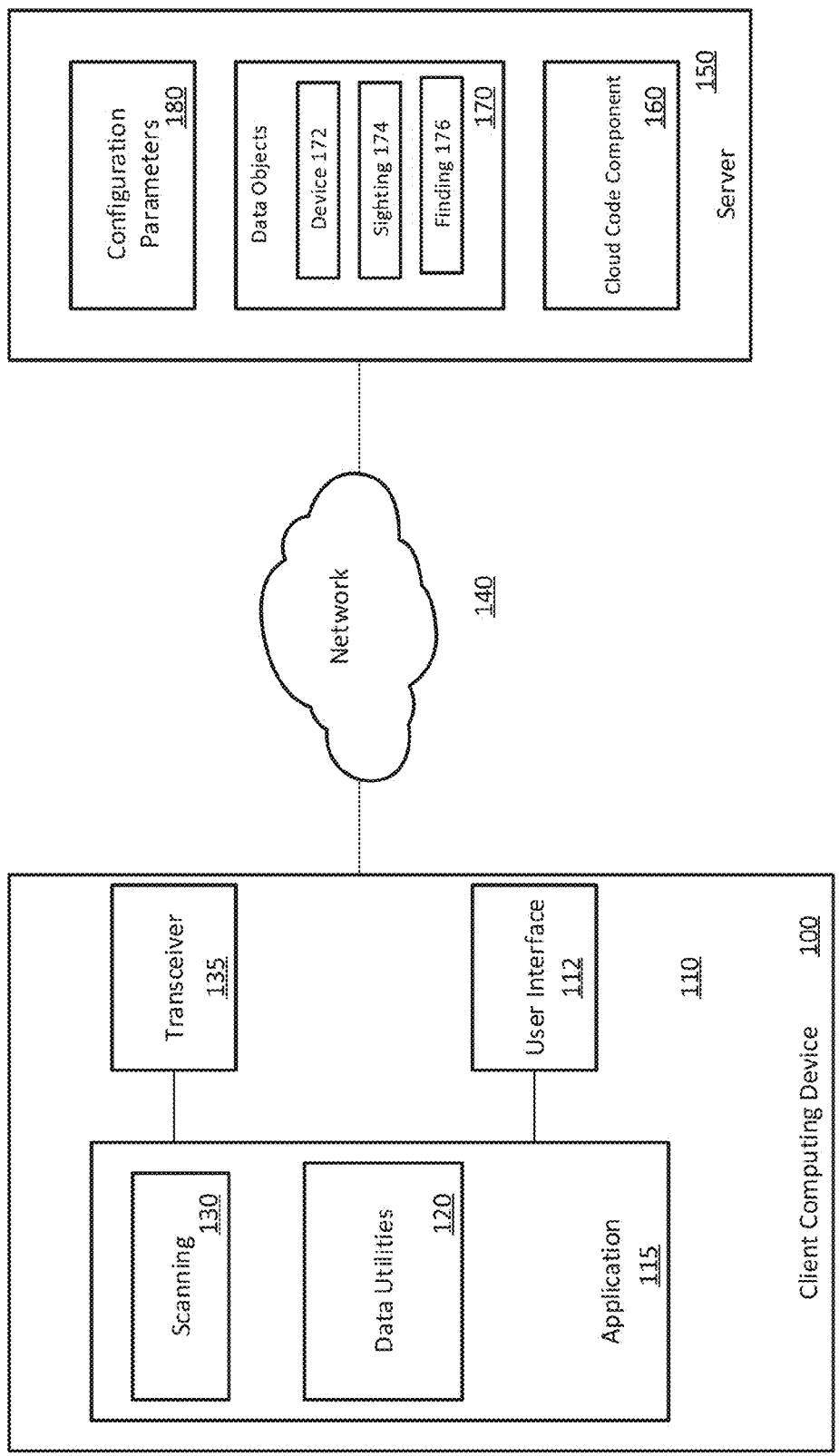
FIG. 1 is a logical diagram of a computing device and server configured to implement aspects of the present disclosure.

FIG. 1 is a logical block diagram depicting components of the present disclosure and how they may interact with one another. The depictions herein are meant to illustrate logical connections only, and are not intended to be a hardware diagram. The components of FIG. 1 may be implemented in hardware, software, firmware, or a combination of software and hardware. FIG. 1 illustrates a client computing device 100, which may be implemented by a desktop or laptop computer, a smartphone, a tablet, a wearable computing device, a dedicated hardware scanning device, or any other computing device capable of implementing the listed components. The client computing device 100 as shown has an application 115 comprising a data utilities component 120 and a scanner module 130 (which may also be referred to as a "scanning module," or "scanner"), each of which will be described in further detail later in this disclosure. Additionally, the client computing device 100 may comprise a transceiver 135 and a user interface 112 with which the application 115 may interact. It is contemplated that in some embodiments, the client computing device 100 may not have a user interface. The application 115 may be a downloadable software application that is displayed on the user interface 112, such as a smartphone app. In other embodiments, the application 115 may be specifically developed for or embedded within a dedicated device without a user interface, such as a dedicated hardware scanner. The client computing device 110 as shown connects to a network 140, such as the Internet, which itself connects to a server 150. The server 150 as shown contains configuration parameters 180, data objects 170, and a cloud code component 160, which will also be described in further detail later in this disclosure.

Figure 2:
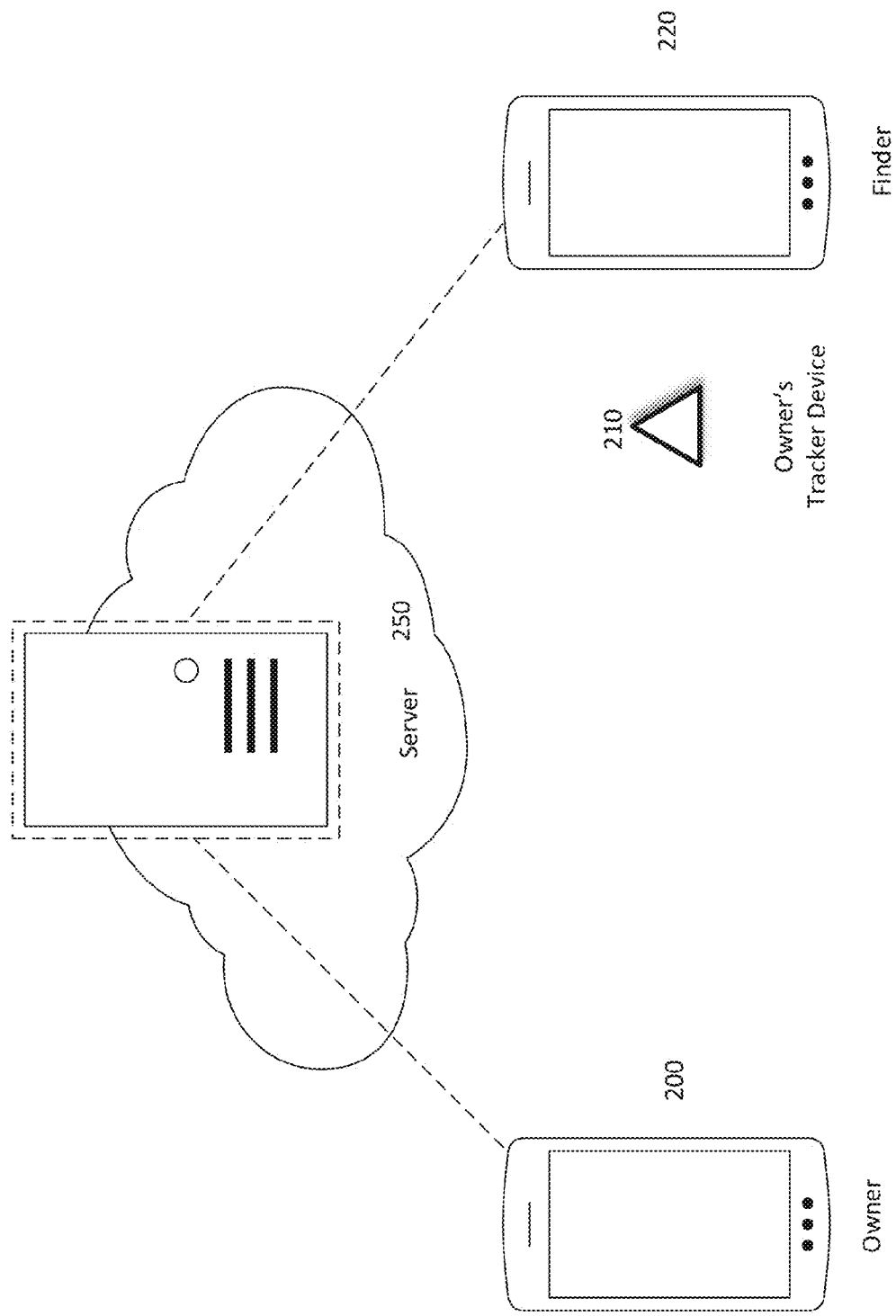
FIG. 2 is a high-level diagram showing aspects of a system for tracking devices.

The scenarios in which the systems of the present disclosure are useful often involve several individuals and several devices. For example, when someone wishes to find a lost tracker device with this system, there is at least one "owner" of that tracker device, and that owner has at least one client computing device (e.g., a smartphone, tablet, laptop, wearable) with a computer application of the present disclosure. FIG. 2 shows a basic diagram that includes an owner's client computing device 200 and an owner's tracker device 210. For ease of reference, an owner's client computing device with a computer application installed on it may be referred to as an "owner's computing device," an "owner's device,' "owner's phone," an owner's computer," or an "owner's app." In many embodiments, the owner of the tracker device may own multiple tracker devices that are tracked by the owner's app. In order to find an owner's lost tracker device, at least one other user of the system, who has a client computing device and a computer application installed on it, also plays a role, which is that of a "finder." In FIG. 2, the finder's client computing device 220 is shown in close proximity to the owner's tracker device 210 to illustrate that the owner's tracker device 210 is in range of the finder 220. For ease of reference, the finder's client computing device with a computer application may be referred to as a "finder's computing device," a "finder's device," a "finder's phone," a "finder's computer," or a "finder's app." It is contemplated that any finder may also have multiple tracker devices of which he or she is the owner, but for purposes of describing the system, the terms "owner" and "finder" shall generally describe the roles of the client computing devices in particular use scenarios at a particular time. Each of the owner's and finder's apps will be in communication with the server 250. Any time an owner wishes to track any of the owner's tracker devices, an owner may designate a tracker device as "trackable." For example, the owner may designate a personal item, such as a set of keys, as trackable. An owner who is an administrator in an enterprise may wish to designate dozens, hundreds, or thousands of enterprise assets as trackable in order to gather data about where those assets are, even if they are not lost. Any time a finder's app sights a tracker device designated by its owner as "lost" or "trackable," the sighting may be referred to as a "new location" if the sighting meets particular criteria. Therefore, not all "sightings" may be categorized as "new locations" for various reasons. Additional details of how sightings work will be discussed later in the disclosure.

Although many examples in this disclosure may refer to a single owner or individual user of a tracker device, it is possible for more than one person to track a given tracker device. For example, more than one family member can track a single set of keys with a single tracker device. More than one administrator may track any given enterprise tracker device. Similarly, though many examples may refer to a single "finder," it is inherent in the nature of a crowd-source location application that multiple finders can find the same tracker device. Additionally, an owner/user of an application of the present disclosure may log in and utilize multiple client devices, such as a laptop and a smartphone, to track any of their tracker devices. In some embodiments, a user may be logged in to instances of the user's application on more than one device at a time.

Several implementations of the system of the present disclosure are contemplated. One implementation may be known as the "individual user" implementation, in which, as described above, allows users to track their own tracker devices that are in range of their own computing device, and to utilize the crowd-source location function if their tracker devices become lost. In the individual user implementation, users may be incentivized to allow the application to run in the background of their devices at all times and provide geolocation updates of the computing device to the server, and to allow the application to continuously perform Bluetooth scans. One problem that exists in current crowd-source location applications is that some users are reluctant to allow the continuous geolocation tracking of their computing devices because of privacy concerns. Another problem is that some users are reluctant to allow continuous Bluetooth scanning because of the potential drain on battery power. One way that the application of the present disclosure incentivizes users is through a "finder's fee mode." The finder's fee mode may be a default mode that rewards finders of others' lost devices with a small fee. In some embodiments, the owner may be the one who pays for information regarding the sighting of a lost device. In other embodiments, the owner may not need to pay for the lost device sighting information, but the finder may still receive a monetary reward for finding the device from another revenue source. As one example, some users who own particular brands of tracker devices may receive updates on sightings of tracker devices for free. In some embodiments, there may be an option for users to sign up for the application anonymously. This anonymous option may incentivize users who are reluctant to have their personal information tied to their geolocation, but who nonetheless wish to track their own tracker devices and utilize the crowd-source location functionality to find their own lost devices. In embodiments where users are anonymous, owners of lost devices may receive lost device sighting information for free from other anonymous users, and anonymous finders may not receive a finder's fee.

Figure 3:
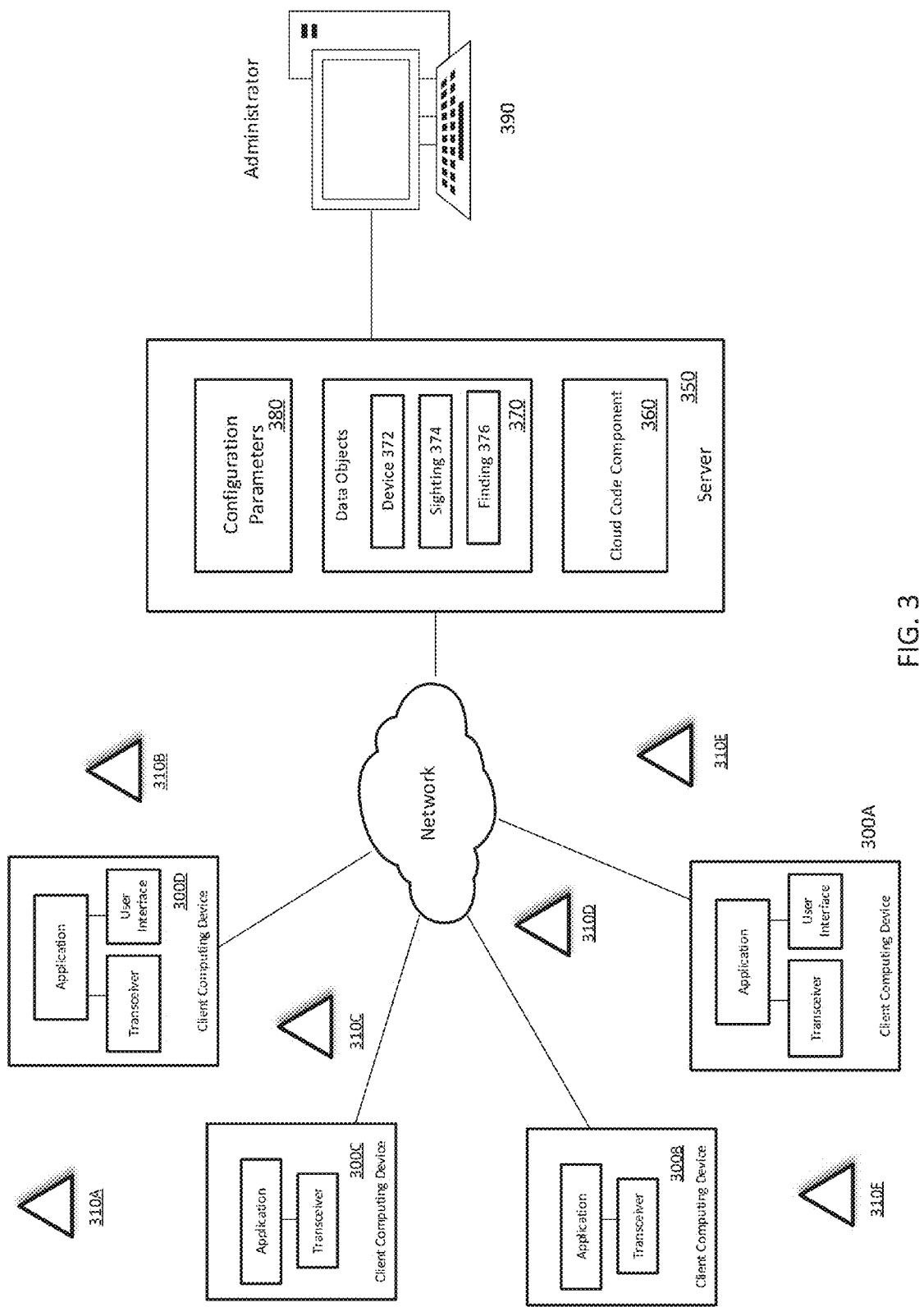
FIG. 3 shows an embodiment of the system of the present disclosure in which multiple locator devices may be used to track multiple tracking devices.

Another implementation of the system is the enterprise tracking embodiment as described previously, in which an administrator may be the owner of dozens, hundreds, or thousands of tracker devices. FIG. 3 shows an example of an implementation with an administrator 390, a server 350, multiple client computing devices 300A-D, and multiple tracking devices 310A-F. An administrator 390 may wish to track the locations of certain business assets at all times which may be equipped with tracking devices 310A-F, and may utilize employees' computing devices 300A-D to implement the crowd-source location function. For example, construction workers on a job site may have applications on their phones that track all the tools on the job site. Employees in a hospital may have applications on their phones that track certain pieces of valuable equipment. Transportation and shipping employees may have applications on their phones that track assets such as vehicles, moving equipment, and containers. It is contemplated that different kinds of enterprises may have different needs as to how often the owner/administrator 390 needs to be apprised of a sighting of a particular piece of equipment. For example, if a construction site has dozens of employees and hundreds of tracked tools, an owner/administrator may not need to be informed about the location of each piece of equipment by every employee's phones every time the equipment moves. The multiple sightings from each employee's phone may be redundant, and the equipment may move frequently. Therefore, such an owner/administrator 390 may only wish to see updates on sightings of equipment at the beginning or end of the day, or at the end of a particular job.

In order to adjust how frequently an administrator 390 is notified, or what criteria must be met to generate a notification, configuration parameters 380 on the server 350 may be configurable (i.e., adjustable) by the administrator 390. If or when the administrator configures the configuration parameters 380, the criteria for what generates a notification may be pushed down to the individual client computing devices 300A-D. In this way, each of the client computing device 300A-D may have the criteria and may compare data received at the client computing devices 300A-D to the configuration parameters 380 as set on the server 350. That is, the comparison may take place locally at each device 300A-300D (via the local scanning and/or data utilities component), and the criteria that the local device has will reflect the criteria pushed down from the server 350.

As another example of criteria that may be configurable, an owner/administrator of hospital equipment may have many employees with phones, and many pieces of equipment that are stationary, and therefore may only wish to be notified when particular pieces of equipment move a significant distance. An owner/administrator of transportation equipment, however, may wish to know the locations of vehicles and moving equipment at all times because they are constantly on the move, and may only have one employee, such as the driver, reliably in range of a given piece of tracked equipment. In such a scenario, the enterprise system may also receive information from the network of individual users. For example, if an individual user is in the same parking lot as an enterprise's tracked vehicle and sights the tracked vehicle, that sighting information may be made available to the enterprise owner/administrator. In some embodiments, the individual user "finder" may receive a finder's fee.

In some embodiments, the enterprise tracking system's databases and the individual users' databases may be kept separately, but in other embodiments they may be used to complement each other and share information. For example, an employee's phone in an enterprise tracking system may sight a lost device that an individual user has lost. The enterprise may not necessarily receive a finder's fee for finding the individual's lost device, but the individual may receive the sighting information nonetheless.

Still referring to FIG. 1, the scanner module 130 of the client computing device 130 may interface with a transceiver 135, an implementation of which may be a BLE radio. As briefly referenced earlier, one aspect of the scanner module 130 is that it may store and/or implement configuration parameters that reflect the configuration parameters 180 on the server 150. Configuration parameters 180 will be described in more detail later in this disclosure, but one purpose of the configuration parameters 180 is to control how often the BLE radio actually scans for tracker devices. Such scans can occur quite frequently. Frequent scans can consume a large amount of computing device power, and in many instances, users may want to control how frequently scans occur. For the purposes of the present disclosure, a "scan" may refer to any time a radio, such as a BLE radio, reads the nearby area for the presence of any trackable devices. A "sighting" may refer to any instance in which a scan is performed and a BLE signal is received by the computing device. Another aspect of the scanner module 130 is that it may contain a peripheral scan cache, which caches the processing for every sighting. Because a client computing device may scan fairly often, sometimes a tracker device that is sighted by the client device may be sighted repeatedly. It may not be desirable to notify the various users of the tracking system every single time a client device sights a particular tracker device. For example, a finder's app may scan an owner's lost keys in a coffee shop. The finder's phone, which may be located with an individual sitting in the coffee shop for several minutes, may sight the lost keys several times a minute, while the keys also sit there for several minutes. Rather than sending a push notification to the finder, and/or the owner every times an object is sighted, the sightings may be kept in the peripheral scan cache and then evaluated to determine whether the particular sightings should generate an instance of a "new location." For purposes of the present disclosure, a "new location" instance may refer to a sighting that meets certain criteria to generate a push notification to interested parties. It is contemplated that every sighting may be sent from the client device 100 to the server 150, and that the server 150 may compare each sighting to a set of criteria (such as RSSI value, significant time elapsed, and significant distance moved) in order to determine whether a "new location" instance should be generated. This comparison to the criteria may also occur on the device before deciding to send the sighting to the server.

In many embodiments, when a new location is created, it may be pushed to the finder's app and/or the owner's app to provide useful information about the location of the new device. As previously discussed, several factors may determine whether a new sighting is created, including whether a tracker device found during a scan is new, whether its signal strength indicates it is close enough to the phone, whether a significant amount of time has elapsed and the tracker device is still there, and if the tracker has moved a significant distance. These factors that determine the instance of a sighting provide the advantages of ensuring that the system is highly responsive and tunable. When the system is tuned to create new sightings based on the above criteria, the system ensures that no possible sightings are missed, and that extraneous sightings are minimized and that owners of lost tracker devices are immediately notified.

One problem that exists in applications that scan tracker devices and then present them visually in a user interface is that the scans are intermittent, and therefore in between scans, the actual location of a device may not be truly known with a high degree of accuracy. Additionally, the RSSI (received signal strength indicator) values of tracker devices are known to be "jumpy." That is, the same device in the same location may emit BLE signals of irregular strength, which can reduce the accuracy of pinpointing the tracker's location by several meters in some cases. An aspect of the scanner 130 that addresses these issues is that it may "smooth out" the various RSSI values and intermittent connections by averaging multiple sightings stored in the peripheral scan cache. The smoothing out of the RSSI values may be implemented by an algorithm and may serve to provide the most accurate visual representation of the location of a tracker device in a user interface. One aspect of the smoothing algorithm includes implementing a slow decline rate of change when a device is no longer seen at all in a given scan, which is slower the longer a particular device has appeared in the cache. That is, the more scans in a row where a device is not seen, the more its odds of not actually being present go up, and so the algorithm reflects this by docking the average RSSI down the more the device ages out until it disappears from the cache completely.

Other aspects of the scanner module 130 may include that tracker devices may be scanned to identify their universal unique device ID (UUDID). A UUDID is any universally unique identifier which can be constructed by reading a device's publicly available information. It may also be written to the tracker device by the scanner module 130 itself. Alternatively, a UUDID may be provided by the device manufacturer specifically for that purpose. It may be a string or a string representation of binary data. A finder's app may be able to determine the make, model, and serial number of any tracker device through its UUDID. The scanner 130 may also provide a list of processed "Devices for Display" to the user interface 110, which may include both devices owned by a particular owner and found by that owner. The scanner 130 may further include a cached location, time and "friendly text" summary which may be displayed to the user.

Still referring to FIG. 1, the client computing device 100 as shown includes a data utilities component 120. The data utilities component 120 may perform several functions, including signaling the user interface 110 when to lock and unlock. It may also manage data object caching, which can include locally caching known owned BLE tracker devices. This allows any found BLE trackers to be presented to the owner quickly without needing to perform a "query all" function to see what found BLE trackers exist. An owner's BLE trackers may be identified to the owner's app by a unique device identifier (UDID) rather than a UUDID. By using UDIDs to identify an owner's known devices, the data utilities component 120 can use a "targeted local query" function to identify the owner's devices, rather than the slower "query all" function.

The data utilities component 120 may also automatically update a device object with a new location if the user whose sighting generated the notification is the same (e.g., the same user from a different phone). Additionally, it may also notify an owner when a new location for a tracker device is available, and automatically update the device object with the new location if not in Finder's Fee mode. In some embodiments, the data utilities component 120 may provide an asynchronous local query function with a completion block for use by the scanner module 130 after the scanner module 130 has processed the raw peripheral data. The data utilities component 120 may also encapsulate "pinning" behavior, otherwise known as local data object representation and persistence, and may also retrieve configuration parameters 180.

In embodiments of the application 115 that utilize the user interface (UI) 112, the user interface 112 allows a user to send commands and receive information about tracker devices. Exemplary depictions of an embodiment of the UI 112 are shown in FIGS. 4-14, and will be described in further detail later in the disclosure. Many functions that are initiated by a user in the UI 112 trigger various push and pull data operations to and from the server 150. For example, functions of the UI 112 can include allowing a user to register and unregister tracker devices, each of which trigger an immediate push operation from the client device 130 to the server 100. That is, once a user registers or deregisters a tracker device, the information is stored on the client device 130 and immediately pushed to the server 100 so that the client device also has the registered/deregistered device info. Additionally, the UI 112 may allow a user to mark a tracker device with a 'notify' flag to indicate interest in receiving notifications through various channels when a new location is generated, such as an immediate push notification or e-mail notification to send e-mails if a lost tracker device is found. It is contemplated that during pushes from the server 150 to the client device 100, a user may temporarily be locked out of making changes to the device through the UI 112. For example, during the short time period when a push is occurring, a user may not be able to set the "notify" flag, edit the name, or register or unregister a device. One reason for the brief lockout is that the information pushed to the server are important to helping the server determine what it needs to do when processing external sightings of the device. If, for some reason, an attribute of a tracker device were to be modified by a user while a push was occurring, the server might not have the correct information about a tracker device, and might make incorrect decisions regarding that device.

Yet other aspects of the UI 112 relate to a function of the system that encourages widespread adoption and use of the application. In order to be highly reliable and useful for finding lost objects, it is necessary for there to be a fairly large number of users of the application. Currently, because there are many individual tracker manufacturers, each with their corresponding applications, the capability of any individual manufacturer's device to be found when lost depends on how many users of the trackers and applications there are. Given that the industry is still nascent at the time of this application, the network of users for each individual company, even those of the market leaders, is too small to allow users to reliably find lost tracker devices. One advantage of the present system of the disclosure is that it can track all tracker devices that emit BLE signals, regardless of the manufacturer. Even devices that are not necessarily trackers themselves, but which emit BLE signals (e.g., FitBit activity trackers) may be tracked. One readily apparent advantage is that the network of available users can now be as large as the entire market of tracker users, rather than just as large as the network of one particular manufacturer. As previously mentioned, an aspect of the system is that users of any type of tracker device may be incentivized to download and use the application of the present disclosure by being offered reward payments for finding others' lost devices. Owners of lost tracker devices are often highly motivated to find their lost trackers, and are willing to pay a modest finder's fee (e.g., a few dollars) for a sighting of the lost tracker. Users may be motivated to allow the application of the present disclosure to run in the background and periodically scan for others' tracker devices for the potential of making money simply by carrying around their phones, which they are already doing. In accordance with these aspects, the UI 112 on a finder's device may send an immediate push to the server 150 upon the occasion of a new sighting at the finder's device. The server 150 may immediately push the new sighting of an owner's lost tracker device to the UI 112 on an owner's device. Upon receiving the push notification about a new sighting, a payment screen (also known as a paywall) may appear on the owner's UI 112 to ask the owner if they would like to pay for the new sighting information. If the owner agrees, the client 150 may then immediately pull the location information of the sighting to the owner's device. The UI 112 may update the location on a map in the UI 112 and additionally reflect the new location's time.

An additional aspect of the disclosure relates to accurately displaying the location of a found tracker device in a way that is useful to a user. Reverse geocoding is a technique known in the art that translates a latitude and longitude location into an address location. This process typically takes at least a few seconds. When a location of a found tracker device is presented to a user on a map, it may be presented in close to real-time. It is possible for there to be delays in the display of the accurate location, especially if the tracker device is moving, because the information has to be relayed from the finder device to the server and from the server to the owner's device. Therefore, the location shown to the owner can only be as accurate as the last scanning frame sent from the finder device to the server. The system can provide the most accurate reverse geocoding, and therefore the most accurate address, by caching the reverse geocoding to the subsequent scanning frame.

Other functions of a UI 112 according to the present disclosure may include user management functions, such as logging in, signing up, managing a session, and installing updates. Additionally, UI 112 functions may include presenting instructions, accessing help resources (including online resources), and presenting end user agreements. Further, the UI 112 may allow a user to reset the tracker devices associated with a particular client device. This action would initiate an immediate push to delete all registered tracker devices. In some embodiments, the user interface would also allow a user to resync all associated tracker devices, which would clear the local cache and send an immediate pull for updated information from the server.

Figure 4:
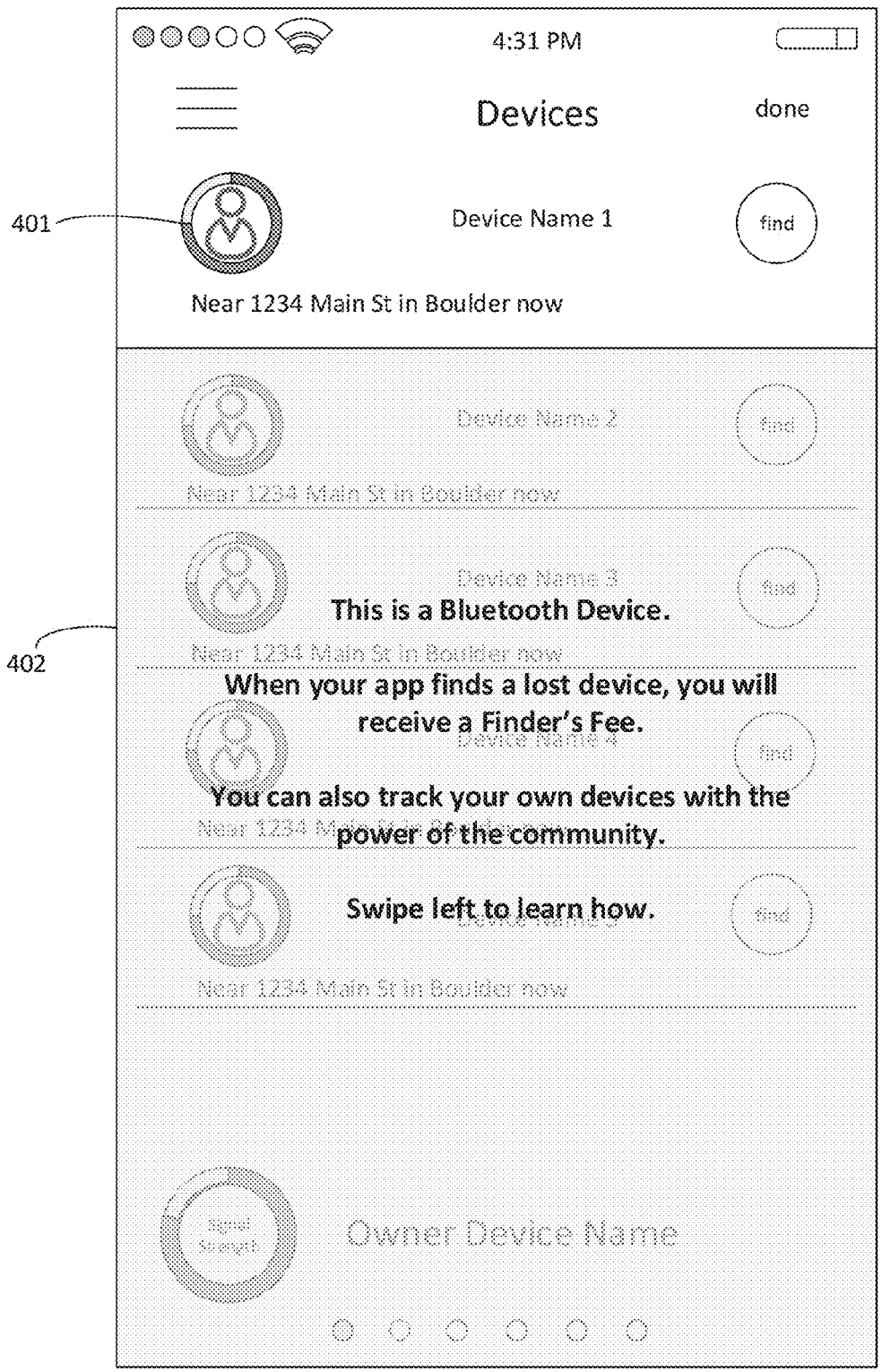
FIG. 4 is an exemplary graphical user interface depicting an introduction function of a downloadable software application of the present disclosure.

Referring now to FIGS. 4-14, shown are exemplary screens of a user interface in accordance with aspects of the present disclosure. A UI 112 of the present disclosure may have several additional screens that are not shown, and other embodiments, such as those for enterprises, may appear to users quite differently. FIG. 4 shows an introductory explanatory screen 400 that describes an owner's tracker devices, by highlighting an icon representing a first device 401. An explanation screen 402 briefly describes aspects of the system, such as that devices may be tracked when they are in range, and may be found when they are out of range.

Figure 5:
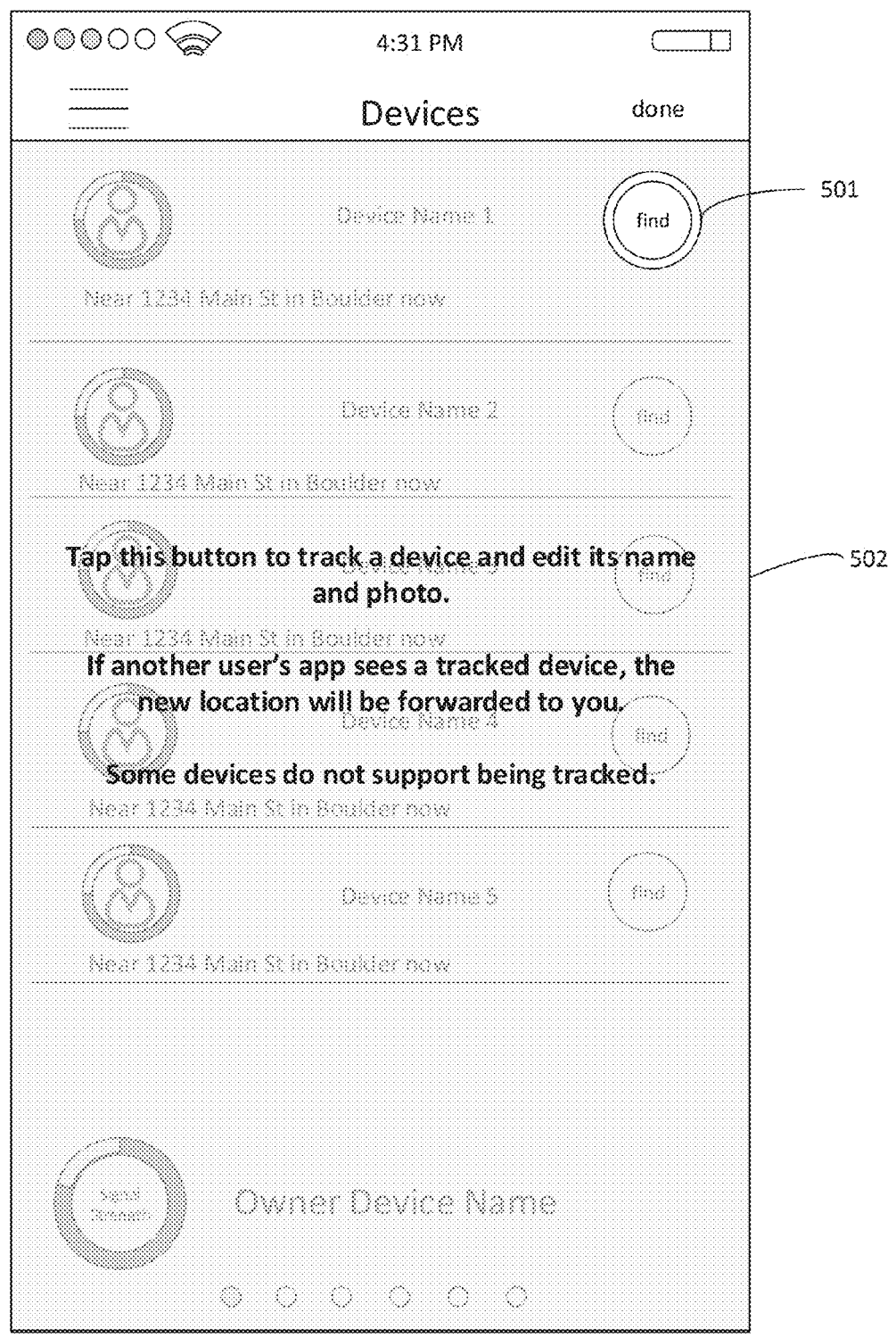
FIG. 5 is an exemplary graphical user interface depicting a device editing function of a downloadable software application of the present disclosure.

Other functions of the application 115 can include the registering, leashing, tracking and editing a name or a photo of a tracker device. FIG. 5 shows a selection and editing screen 500. A user may select a "find" icon 501 to select a particular device to track, register, edit, or perform other functions upon. Another explanation screen 502 may explain how to select a device as well as describe other features of the application 115.

Figure 6:
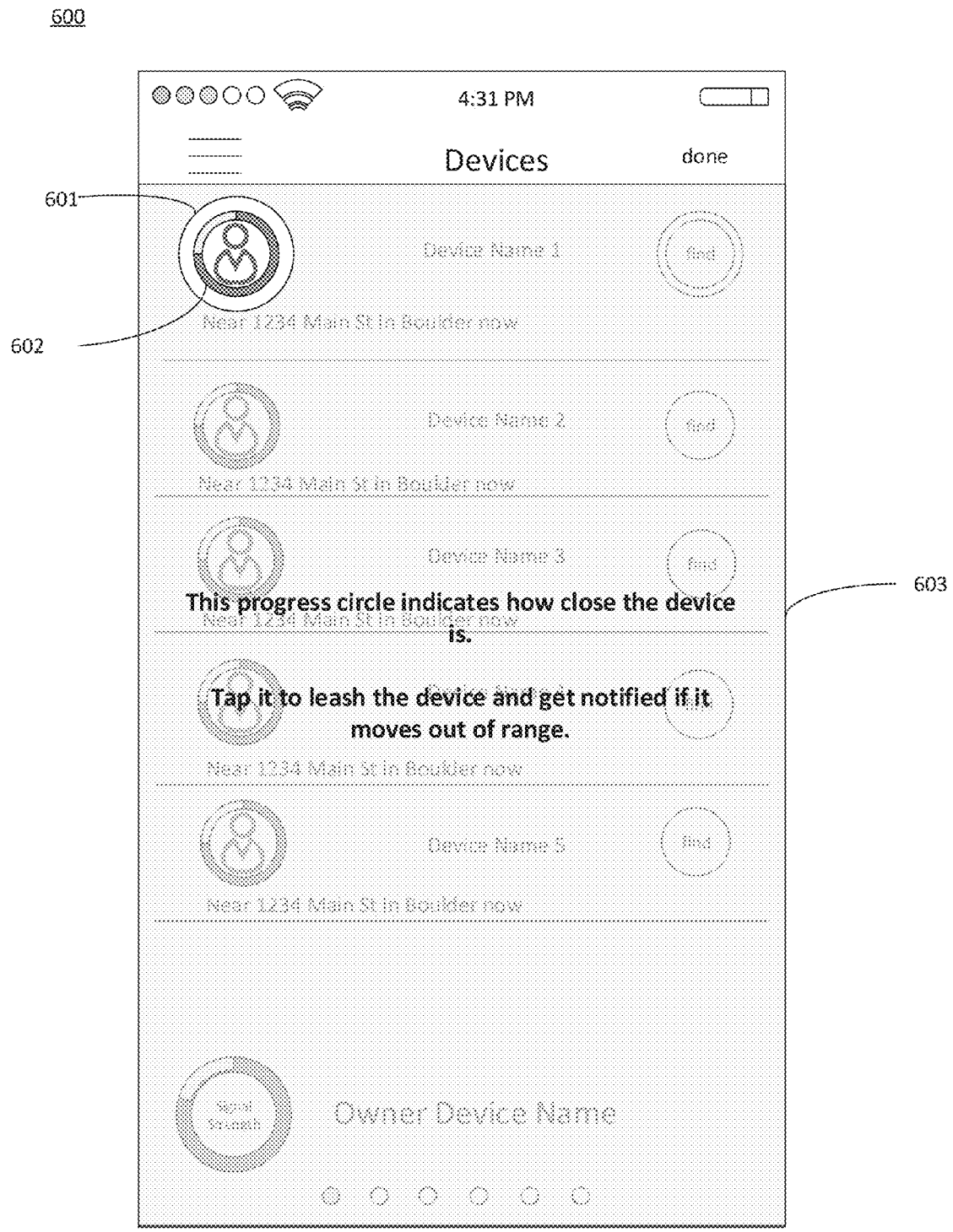
FIG. 6 is an exemplary graphical user interface depicting a detection or scanning function of a downloadable software application of the present disclosure.

FIG. 6 shows a detection screen 600. Shown is a tracking icon 601 with a progress circle 602. The progress circle 602 may be a graphical representation of how near or far a tracked device is. In the embodiment shown, the progress circle 602 may become filled in more completely when a tracked device is close and less filled in when it is farther away. Other graphical representations are contemplated, such as vertical or linear bars, for example. An explanation screen 603 describes how the tracing icon 601 may be tapped in order to "leash" a device, the function of which will be described with reference to FIG. 11.

Figure 7:
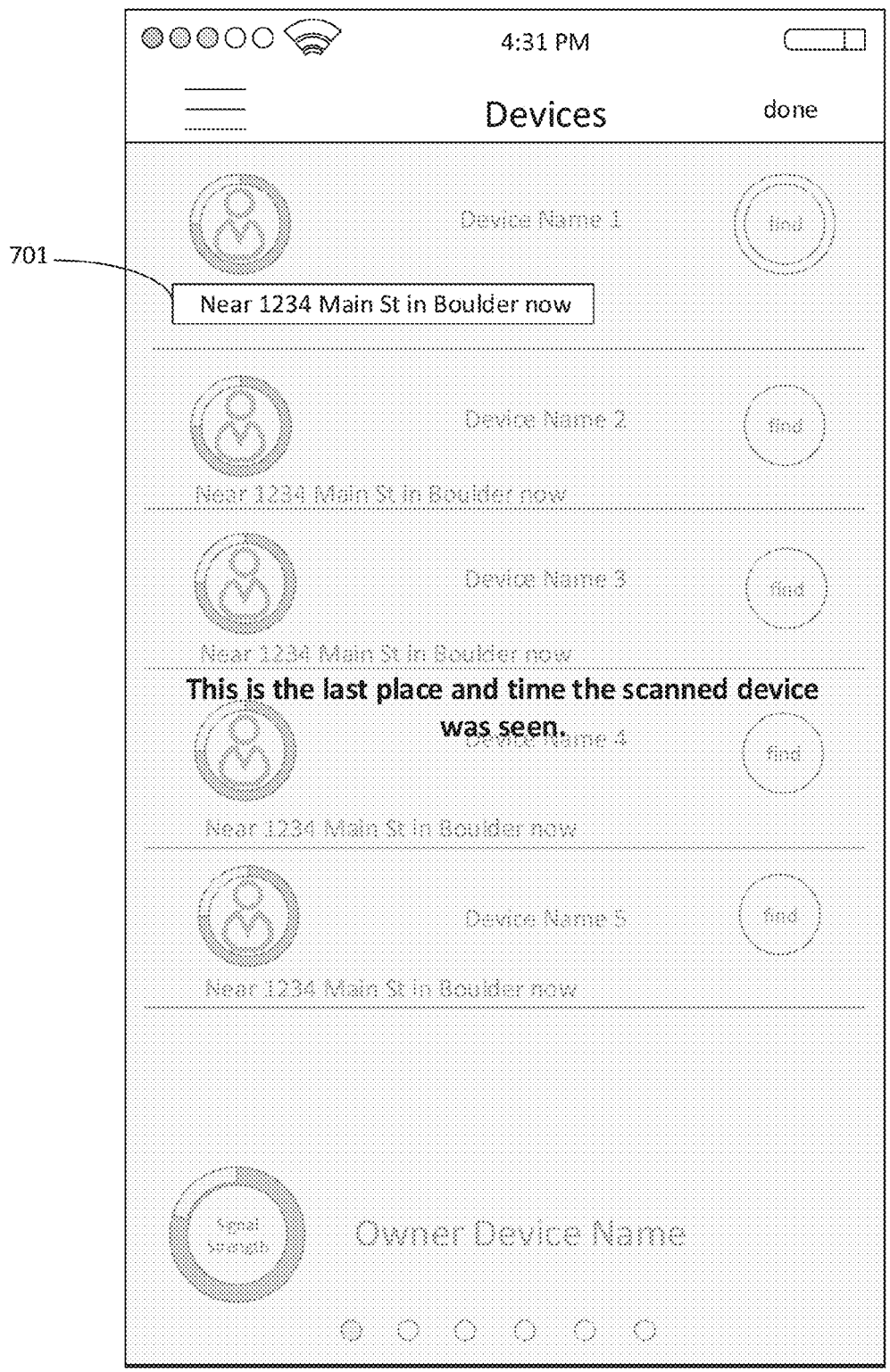
FIG. 7 is an exemplary graphical user interface depicting a tracking function of a registered trackable device using a downloadable software application of the present disclosure.

FIG. 7 depicts a tracking screen 700 highlighting location information 701 associated with a particular device. In the embodiment shown, the location information 701 comprises a particular address, which may be provided as a result of reverse geocoding as described earlier in the disclosure. It is contemplated that in other embodiments, the location information may comprise other types of descriptions besides an address, such as the name of a building or a business.

Figure 8:
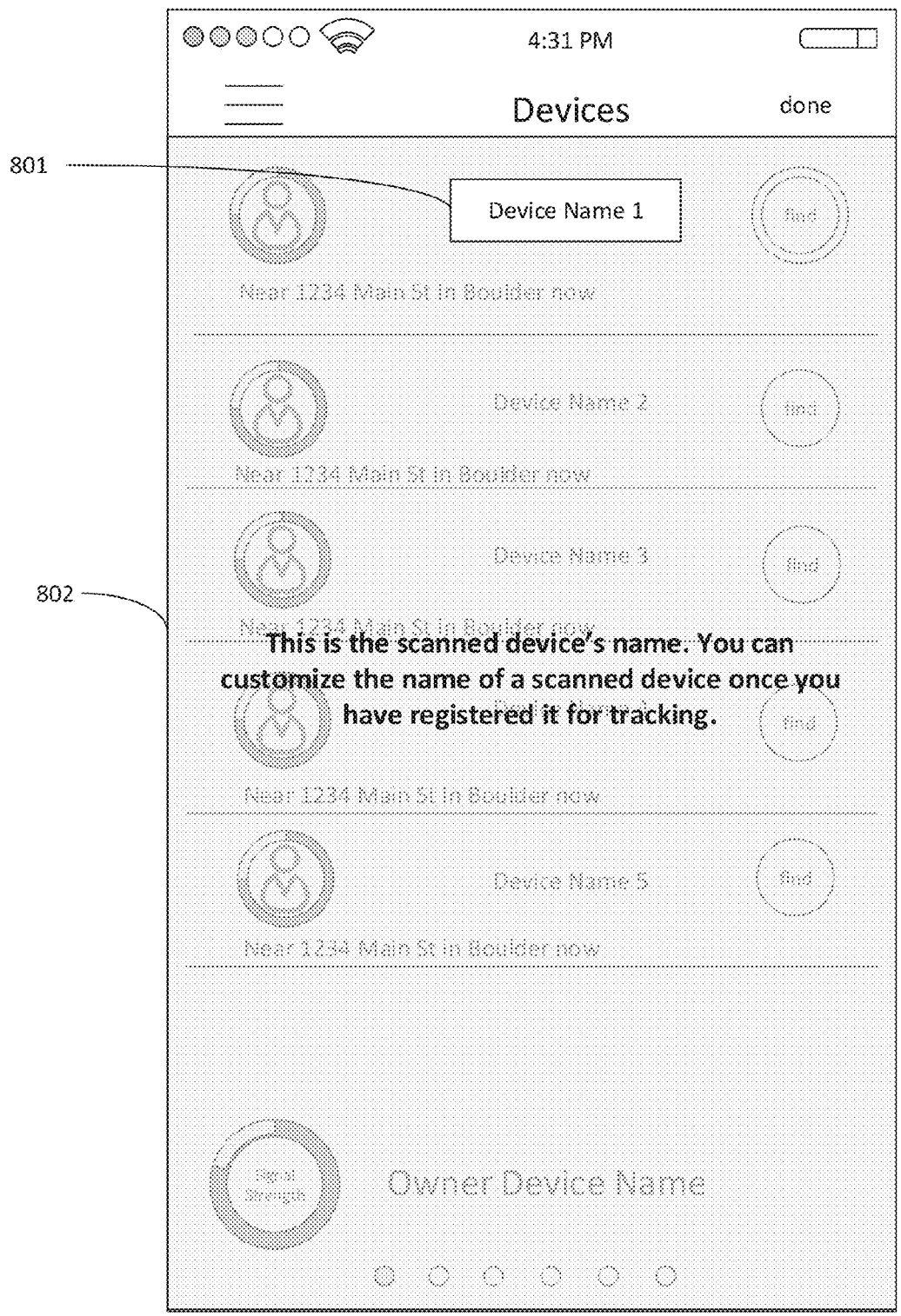
FIG. 8 is an exemplary graphical user interface depicting a registration function of a downloadable software application of the present disclosure.

FIG. 8 shows a device naming screen 800 highlighting a device name 801. An explanation screen 802 describes a feature of being able to edit the name of a device. A particular tracker device might initially be named something generic, using the tracker's manufacturer name and serial number, for example, but an owner of the device will often desire to change the name and picture to something more easily recognizable. For example, a user that attaches a tracker to a set of keys may wish to change the name of the tracker to "Keys" and may take a photo of them to display next to the name of the tracker. In some embodiments, an edited name of a tracker may be relayed from the client device to the server via a "lazy push," meaning it may be pushed to the server only when other "immediate push" information is sent, in order to reduce the number of push transmissions for information that is not necessarily time-sensitive. In some embodiments, photos of a user's tracker device may be stored only locally, at an owner's device. This local storage may be advantageous in terms of minimizing information storage on the server and in terms of increasing security by only having the photos available to the owners of the tracker devices.

Figure 9:
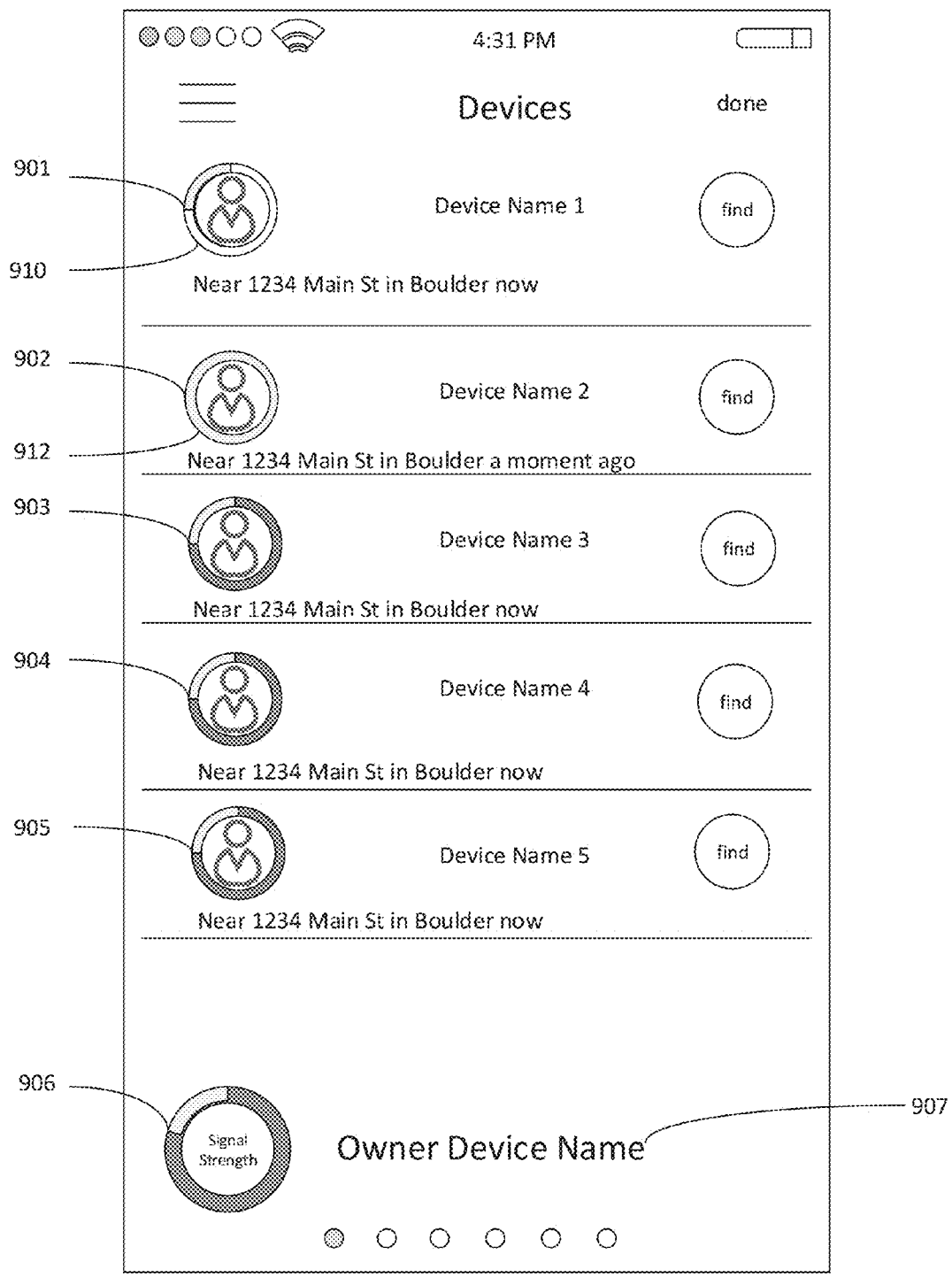
FIG. 9 is an exemplary graphical user interface depicting how multiple registered tracking devices may be tracked with a downloadable software application of the present disclosure.

FIG. 9 shows an exemplary device list screen 900 of several of an owner's tracked devices that are currently within range. A first device 901 is depicted with a highlighted progress circle to indicate that the device 901 is leashed for notifications if it moves out of range. A second device 902 has an empty progress circle 912 that indicates the device 902 is out of range. Devices 903-905 are depicted as within range of the owner's computing device. The device list screen may also indicate other features, such as an overall signal strength indicator 906 of the owner's device (e.g., the tracking signal strength of a BLE radio on the owner's device) and an owner device name 907.

Figure 10:
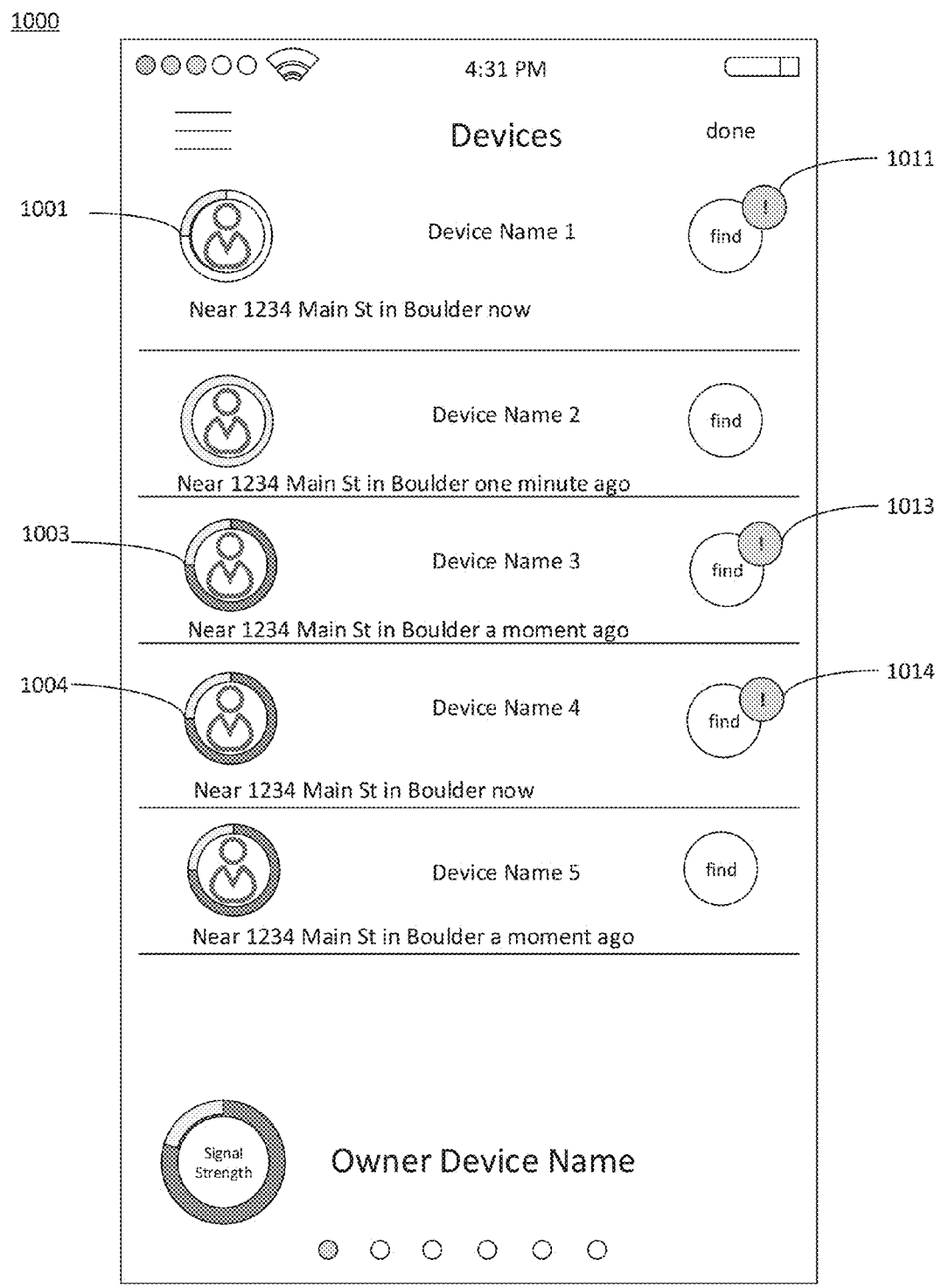
FIG. 10 is an exemplary graphical user interface depicting a finding function of a downloadable software application of the present disclosure.

FIG. 10 shows an exemplary find screen 1000 of several of an owners tracked devices, with several devices 1001, 1003, and 1004 showing a new location alert 1011 indicating that a new location is available. As shown, device 1001 is out of range and leashed, so its location may still be found by other devices. Devices 1003 and 1004 are still in range of the owner's device, but a new location is still available to the user. For example, the device may have moved a distance significant enough to meet the criteria for a new location according to the configuration parameters, which may be the reason the new location alerts 1013 and 1014 are displayed.

Figure 11:
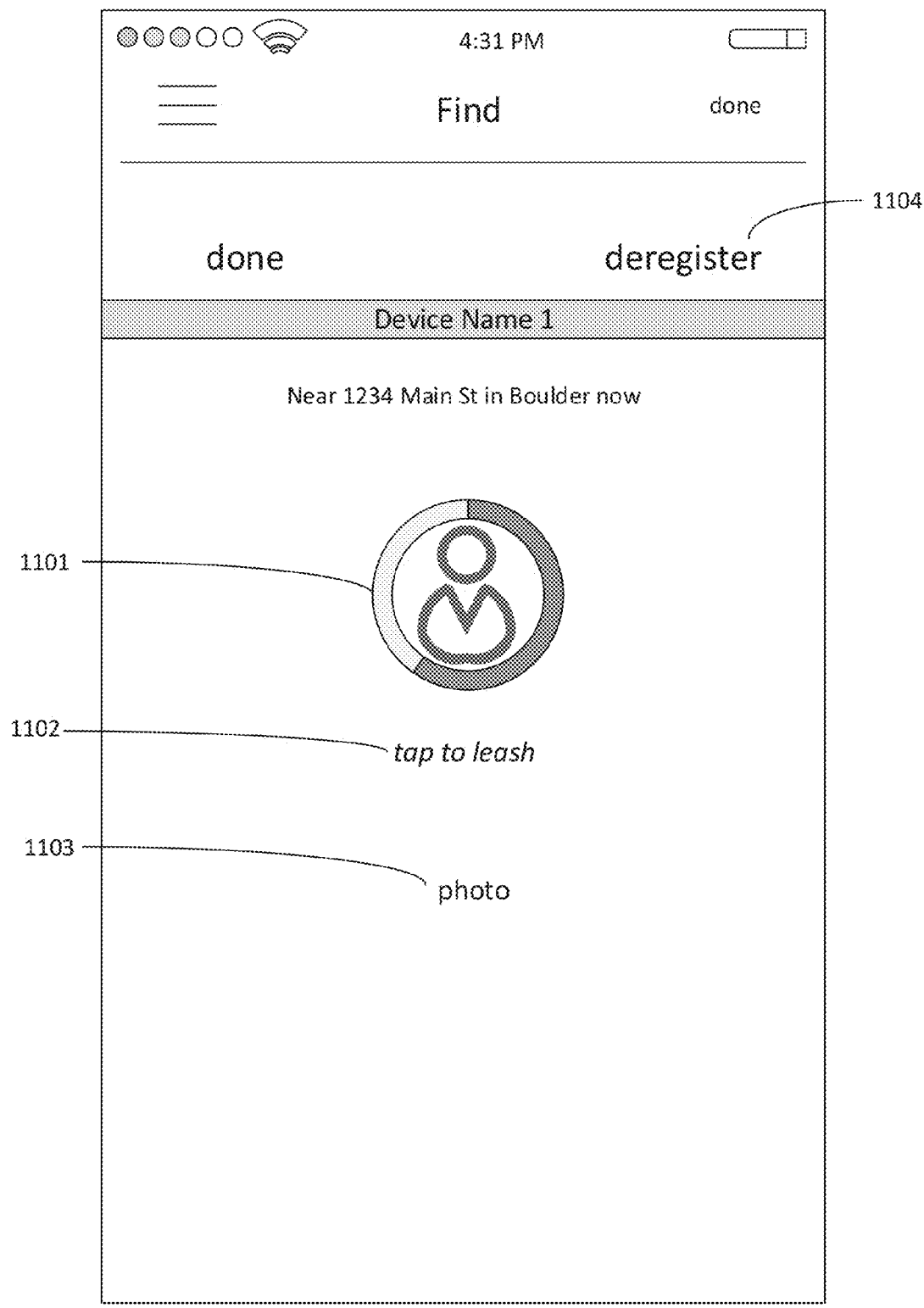
FIG. 11 is an exemplary graphical user interface depicting a registration and customization function of a downloadable software application of the present disclosure.
Figure 12:
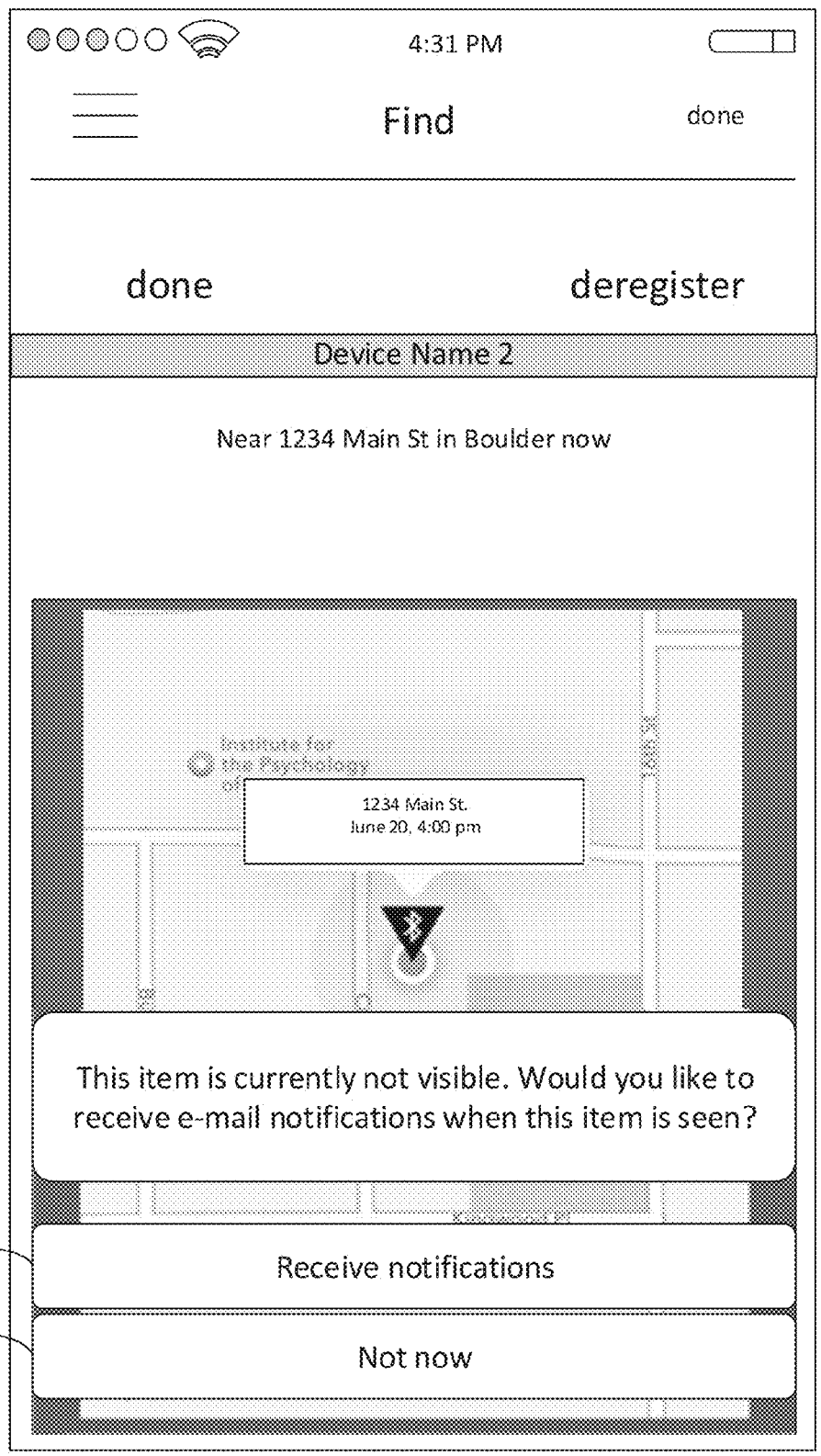
FIG. 12 is an exemplary graphical user interface depicting geographical location notification function of a downloadable software application of the present disclosure.

FIG. 11 shows a leashing screen 1100 showing details of one particular registered device 1101 belonging to an owner, along with options to "leash" the device 1102 (meaning to initiate a notification if the tracker device moves out of range), to change the photo 1103, and to deregister the device 1104. FIG. 12 shows an e-mail notification screen 1200 depicting options 1201 and 1202 to initiate e-mail notifications if a tracker device is out of range.

Figure 13:
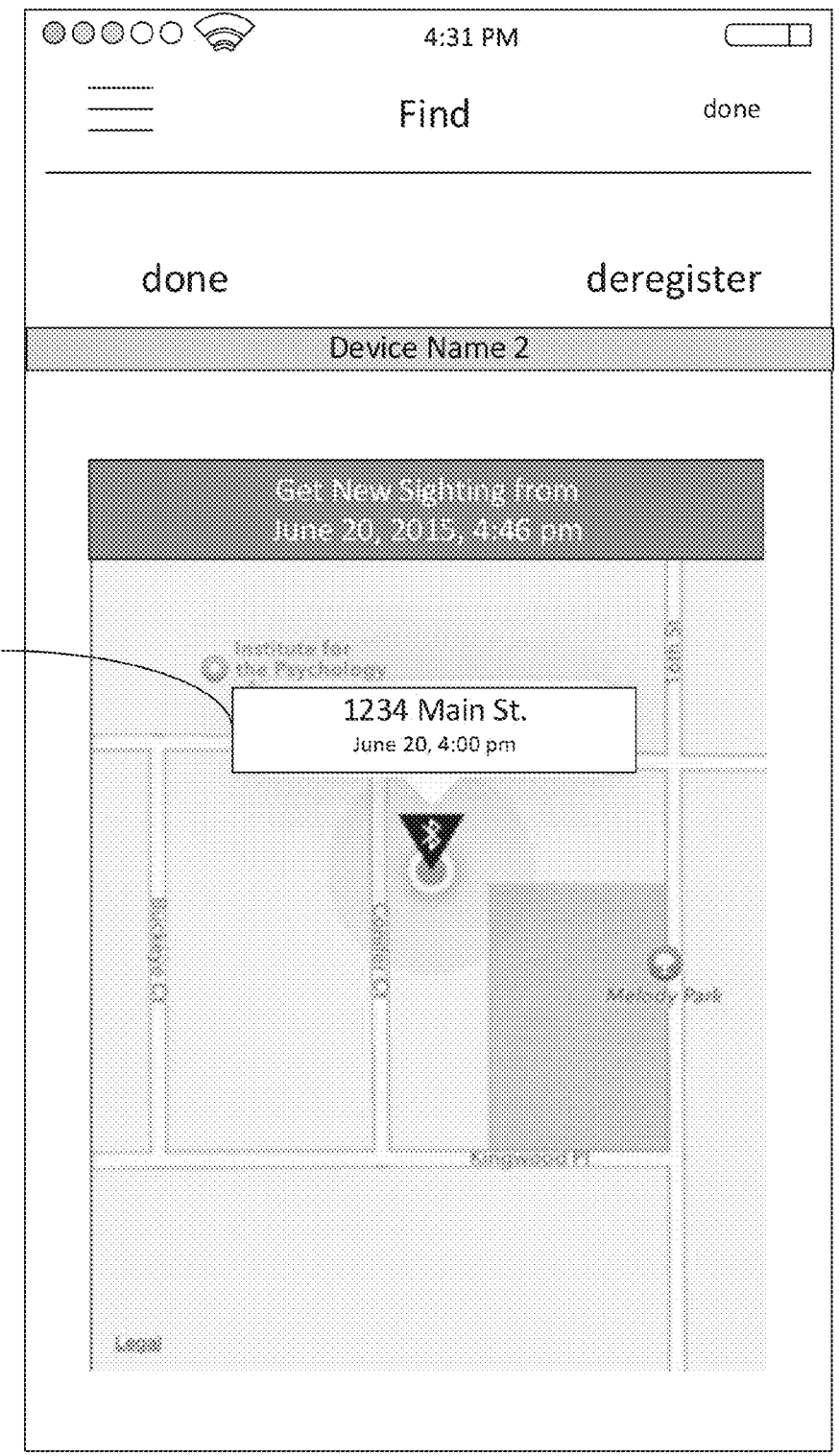
FIG. 13 is an exemplary graphical user interface depicting a geographical location presentation function of an downloadable software application of the present disclosure.
Figure 14:
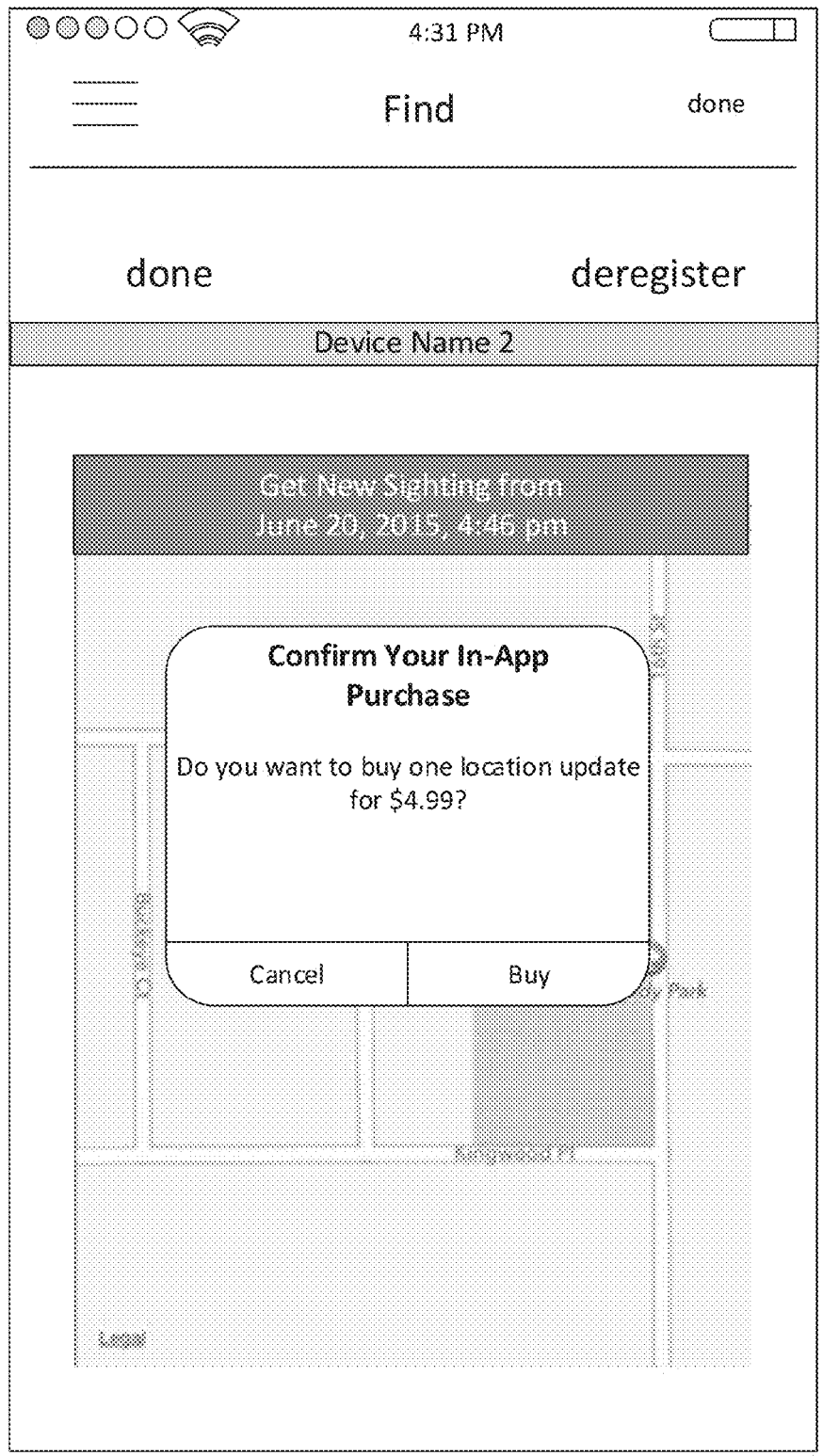
FIG. 14 is an exemplary graphical user interface depicting a graphical payment interface function of a downloadable software application of the present disclosure.

FIG. 13 shows a new location screen 1300 without a graphical payment interface or "paywall" screen, depicting an embodiment where a geographical location 1301 of a device is available. FIG. 14, in contrast, shows a new location screen 1400 that appears when a new location of a leashed lost or trackable device is available in a finder's fee mode, along with a paywall screen 1401.

Other aspects of the present disclosure relate to a part of a system implemented in a software application located on a server 150. Referring back to FIG. 1, but turning now to the server 150, shown are several components of a server 150 including configuration parameters 180, data objects 170 and a cloud code component 160. Depending on the embodiment, various components of the server 150 may be implemented by known hosting frameworks for managing applications. For example, the data objects 170 may include known objects for user management, push functionality, server processing, runtime configuration parameters for an application on a client device, and data storage. The server 150, and in particular, data objects 170 may also comprise several unique component objects. Namely, these unique data objects include a "Device" object, a "Sighting" object, and a "Finding" object.

The cloud code component 160 executes several processing functions in conjunction with the data objects 170. These functions include saving individual sightings and post processing them, determining whether a sighting of a particular device is newer than the last sighting, and actually copying the new sighting info into the device object 172. The cloud code component also notifies an owner client via a server push and notifies the owner via e-mail if the owner has selected that option. Additionally, the cloud code component performs the functions of saving information about owners' tracker devices in the device object 172 and pre-processing that device information to determine if a new sighting was copied to the device object 172, and to create a record in the Finding object 176.

The Device object 172 may be thought of as a table and has several functions. Whenever a tracker device is uniquely identifiable, a user can register it with the server on a screen of the application 115 through the UI 112. A registered tracker device shows up as a row in the table of the Device object 172. Updates to a tracker device which happen on the client computing device 100 are also reflected in a table of the Device object 172. Critical updates, which may comprise any data which the server Sighting object 174 post-processing might need, are pushed immediately from the client computing device 100 to the server 150. Information about tracker devices are pushed by the client device to the server when the application is sent to the background. Information about tracker devices are pulled when the app is opened or resynched, or a when a notification is received from the server 150 that a device has a new location. An owner's tracker devices can also be deregistered in bulk through the application 115 on the UI 112 on the client computing device 100 using the "reset" button, or can be individually deregistered using the "deregister" button on the Device Details screen as shown in FIG. 11. When deregistration occurs, the Device object 172 updates its table accordingly. The server pre-processes Device updates to determine if a Find has occurred. A Find occurs when Device.externalTime, Device.externalLat and Device.externalLon are about to be copied to Device.time, Device.lat, Device.lon. This order to copy always happens on the client device. The server allows the update and then creates a record in the Find table, which is discussed further in this disclosure in relation to the Finding object 176.

The Sighting object 174 may also be thought of as a table in some aspects, and also has several functions. Whenever the scanner 130 sees a tracker device, it creates a local sighting object. If a sighting qualifies to be uploaded to the server, a copy of it shows up in the Sighting object 174. Sightings are filtered before being uploaded to the server to prevent redundant information from being sent repeatedly. For example, if a device is not present in the cache at the time of the sighting, (i.e., it is a new sighting), then the sighting is sent to the server. If the sighted tracker device is already in the cache, then a subsequent sighting will only be sent to the server if it meets criteria surrounding the "significant time" and "significant distance" metrics. The server then post-processes a sighting to determine if the UUDID of the particular sighting matches any UUDID located in the Device object 172. Tracker devices can be registered by multiple users, so it is possible that there can be more than one of the same particular device with a UUDID. If there is a match between the particular sighting UUDID in the Sighting object 174 and a particular device UUDID in the Device object 172, the server looks to see if the field "Sighting.time" (indicating the time of the most recent sighting) is newer than the field "Device.time" and the field "Device.externalTime" (indicating the last time the tracker device was seen.) If it is, then it is a newer sighting of the device. The server 150 then copies the fields "Sighting.time," "Sighting.lat," (indicating the latitude) "Sighting.lon," (indicating the longitude) and "Sighting.username" (indicating the username of the finder) to the Device object 172, into the fields "Device.externalTime," "Device.externalLat," and "Device.externalLon." Once this occurs, the server 150 also sends a push notification to the device as designated by the field "Device.deviceToken," which indicates that a new location is available to the owner's client device, and an e-mail to the field "Device.username" if the field "Device.lost" (i.e., the notify flag) is set to "true," which would occur if the owner had turned on the "notify if found" feature as shown in FIG. 13.

When a tracker device contained within the Device object 172 receives this notification that the tracker device has been found, the server 150 notifies the owner (according to the owner's computing device settings) and, when opened, the application downloads the updated information from the Device object 172 from the server 150. If the application is running in its default finder's fee mode, and the field "User.username" (i.e., the owner) is not the same as the field "Device.externalSighter," it means that another person (i.e., the finder) is the one who sighted the owner's tracker device. The owner may be informed of the availability of a new location for their tracker device via a "!" badge and a red button on the device details page, as shown by the new alerts 1011, 1013, and 1014 in FIG. 10 The badge may also indicate the time of the new location. When the owner presses the button and completes the In-App Purchase process (as shown in FIG. 14), the owner's client device copies the fields "Sighting.externalLat," "Sighting.externalLon," and "Sighting.time" to "Device.lat," "Device.lon," and "Device.time" and pushes the tracker device update to the server. If the application is running in finder's fee mode and the field "User.username" is the same as the field "Device.externalSighter," that means that one of the owner's client devices found the owner's tracking device, and no paywall is presented. Additionally, if the owner's client device is not running in finder's fee mode for any reason, there is also no paywall, such as in FIG. 13. In these cases, the client device simply copies Sighting.externalLat, Sighting.externalLon, and Sighting.time to Device.lat, Device.lon, Device.time and pushes the tracker device update to the server.

Another component object in the server is the Finding object 176. The Finding object 176 may also be thought of as a table, and its main function is to audit finds in order to award finder's fees. During the pre-processing of a particular found tracker device, entries are made into the Finder object 176. These entries include the "finderName," the "loserName," the "deviceName," and the UUID. Each of the entries in these fields are verified by comparing fields on the Device object 172 and the Sighting object 174.

Another aspect of the disclosure relates to how the system of the present disclosure can accurately determine the location of tracker devices, and how the system can be configured to meet the particular needs of individuals and enterprises. The configuration parameters component 180 of the server hosts dynamic configuration parameters which are used by the client device to self-configure and re-configure at runtime. The following configuration parameters listed herein are examples of the kind that may be used in the configuration parameters component 180, and are not exhaustive. "AdvertisingUUIDs" are a configuration parameter corresponding to the Bluetooth Advertising UUID GATT specification. They are used for scanning when app is in background mode. Each UUID corresponds to a supported, trackable device. A "deviceLookupDictionary" may comprise lookup parameters for some of the supported, trackable devices (some devices are identified differently). These are used by scanning code to find the Device UUID. Adding these parameters here adds device support without needing to recompile or redistribute the app. "BackgroundScanTime" is a parameter regarding how long the scanner spends scanning for signals when the app is in the background.

"ForegroundScanTime" is a parameter regarding how long the scanner spends scanning for signals when the app is in the foreground. A "minimumScanInterval" is a parameter regarding how long the system waits before doing the next scan (if it is less than the foreground scan time+scan processing time, the next scan happens immediately). This parameter weighs battery life impact against the promptness of sighting pushes.

Several other configuration parameters may also be implemented in configuration parameters component 180. As discussed previously, one or more of these configuration parameters may be configurable by an administrator of the system. "NoFindersFeeMode" is a parameter that determines if paywall should be presented before new location is provided. "PullDevicesInterval" is a failsafe parameter that ensures tracker devices are updated locally if the organic use of app doesn't trigger the update. "PushDevicesInterval" is a failsafe parameter to ensure tracker devices are updated on the server if the organic use of app doesn't trigger the update. "RefreshConfigInterval" is a parameter regarding how often a client should query the server for updated configuration parameters. "SensitivityRSSI" is a parameter regarding the minimum signal strength required before device is 'visible' to user and qualified as a Sighting. Setting this minimum to a higher number would reduce network impacts and noise from frequent sightings in densely populated areas. It also increases sighting accuracy, as the user is more likely to be closer to the tracker device. "SignificantDistanceMeters" is a parameter regarding the number of meters a sighted object must move before a new sighting of it is pushed to the server. Setting this parameter to be lower causes more frequent and more precise sightings. "SignificantTimeSeconds" is a parameter regarding the number of seconds which must elapse before a persistent sighting of an object is pushed to the server again. Setting this parameter lower 'reassures' the server that a tracker device is still present and allows the server to push notifications to updated registered tracker devices more often. The server may also have an opportunity to re-evaluate the tracker device in the case where the registrant has changed settings such as "notify" or "time," causing a different event to occur with the new sighting.

The system and its components described herein describe the particular ways in which data collected from UUDIDs may be utilized to crowd-source the location of tracker devices. However, many other types of data can be collected from BLE or other radio technology devices. For example, many sensor devices enabled with BLE are currently used to collect environmental data, such as moisture, temperature, sound, or light. Therefore, it is contemplated that aspects of the disclosure that utilize UUDIDs to crowd-source the location of devices can also collect other device data for the purposes of crowd-sourcing that other data. For example, a system in accordance with the present disclosure could crowd-source the information about moisture levels from a multitude of moisture sensors, or the information about temperature from multiple temperature sensors. These kinds of crowd-sourced data could be sent to a cloud server and be transmitted or relayed to any remote client device that requests or requires such information. In some embodiments, the application of the present disclosure may be capable of not only reading such data, but may also be able to write commands or otherwise send instructions to the sensor devices in response to the data. For example, it is contemplated that a device that emits detectable sensor information, such as temperature, may also be a device that is capable of controlling temperature itself, such as a thermostat. Therefore, in some embodiments of the present disclosure, a client device that receives detectable radio information about a readable/controllable device (either locally, itself, or from external crowd-sourcing client devices) may transmit commands back to one or more readable/controllable devices. It is contemplated that any of the functions described herein using UUDIDs to crowd-source location may also be used to in embodiments that use other kinds of detectable, emitted radio signals to crowd-source other kinds of information.

The aspects of the present disclosure described herein allow for several advantages related to accuracy, reliability, and usability of a crowd-source location system. The configurability of configuration parameters on the server allows fine-tuning of alert control. The smoothing algorithm described herein solves the problems associated with intermittent radio connections and jumpy RSSI values. The dynamic configuration of UUDID lookups allows for accurate identification of unknown tracker devices. Asynchronous scanning and data threads allow for UI responsiveness and accuracy by locking devices in the UI during data updates via the data layer. Having a local sightings cache reduces the need for user devices to pull and lookup information from the server, and rather allows important information to be pushed to the server. The client pushes information about tracker devices only on critical updates and caches other information locally, which also reduces the amount of information transmitted between a client device and the server. Caching the reverse geocoding to the subsequent scanning frame allows the UI to remain responsive during the geocoding process and to display a location when the location service is currently unavailable.

Additional benefits include that by using server push notifications to trigger pulls, there is a reduced need to poll the server for device updates, further reducing network traffic. Another benefit is the containment of modifications of data by server code. Finally, because the scanner and the data utilities operate as a binary, separate from the user interface, the UI and the functionality of the system can be customized to the needs of various enterprises.

Figure 15:
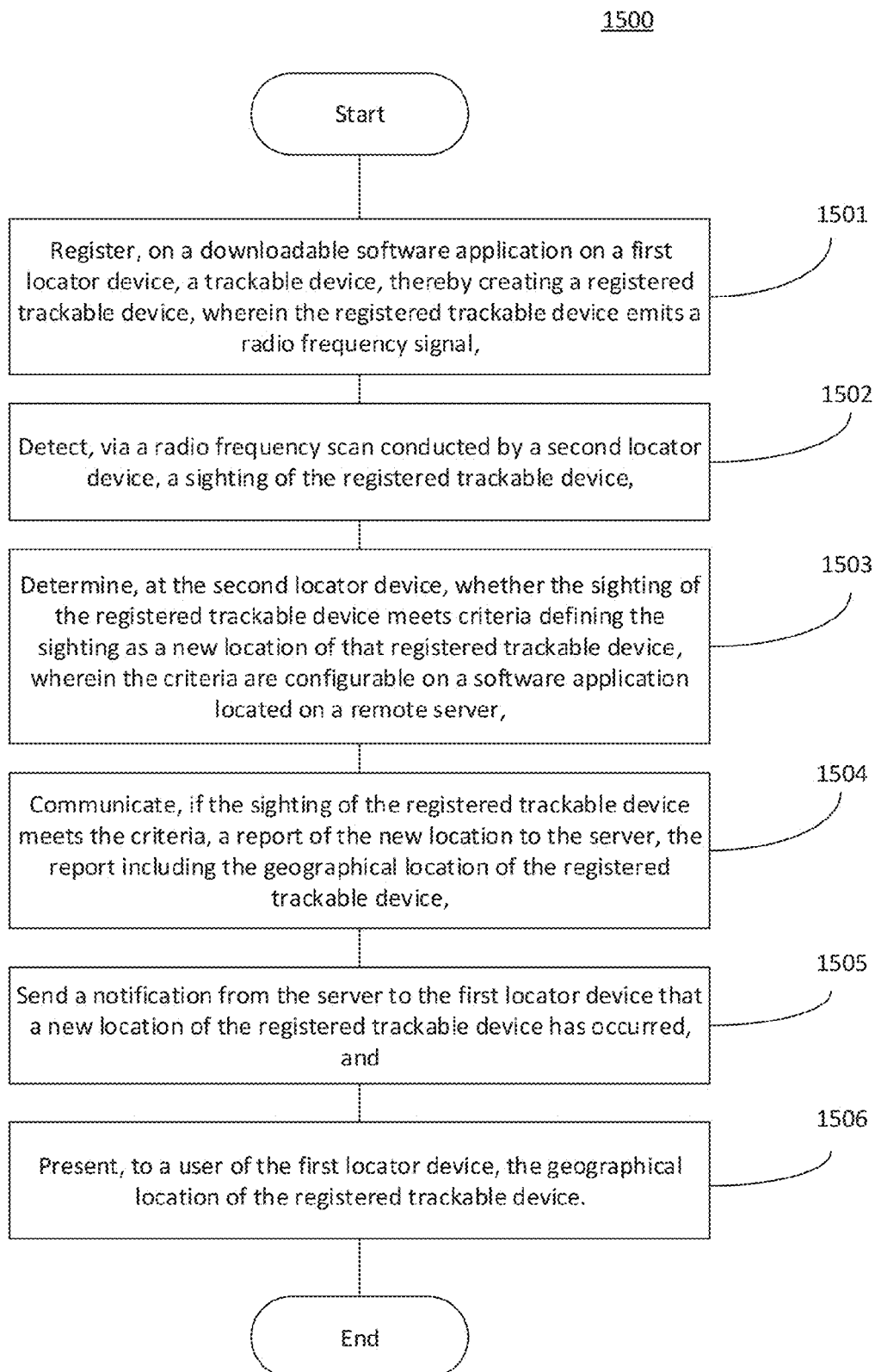
FIG. 15 is a logical block diagram of a computing device which may implement aspects of the present disclosure.

FIG. 15 is a flowchart depicting a method 1500 of the present disclosure for locating radio-frequency-emitting devices. The various steps of the method may be implemented by various hardware and software components described throughout the present disclosure, references to which may be made simultaneously throughout the description of the method 1500. The method may first comprise, at step 1501 registering, on a downloadable software application on a first locator device, a trackable device, thereby creating a registered trackable device, wherein the registered trackable device emits a radio frequency signal. The downloadable software application may be implemented by the application as described in FIGS. 4-13, and registering may take place on a screen such as that depicted in FIG. 5. The first locator device may be implemented by, for example, the client computing device 100 of FIG. 1, the owner device 200 of FIG. 2, or any of the client computing devices 300A-D of FIG. 3. The registered trackable device may be implemented by, for example, the owner's tracker device 210 of FIG. 2. or any of the tracker devices 310A-F of FIG. 3. The method may then comprise, at step 1502, detecting, via a radio frequency scan conducted by a second locator device, a sighting of the registered trackable device. The second locator device may be implemented by, for example, the client computing device 100 of FIG. 1, the finder device 220 of FIG. 2, or any of the client computing devices 300A-D of FIG. 3. The method may then comprise, at step 1503, determining, at the second locator device, whether the sighting of the registered trackable device meets criteria defining the sighting as a new location of that registered trackable device, wherein the criteria are configurable on a software application located on a server. The server may be implemented by the server 150 of FIG. 1, for example, and the configurable criteria may be implemented by the configuration parameters 180. Further, the method may include, at step 1504, communicating, if the sighting of the registered trackable device meets the criteria, a report of the new location to the server, the report including the geographical location of the registered trackable device. At step 1505, the method may include sending a notification from the server to the first locator device that a new location of the registered trackable device has occurred. At step 1506, the method may include presenting, to a user of the first locator device, the geographical location of the registered trackable device.

Figure 16:
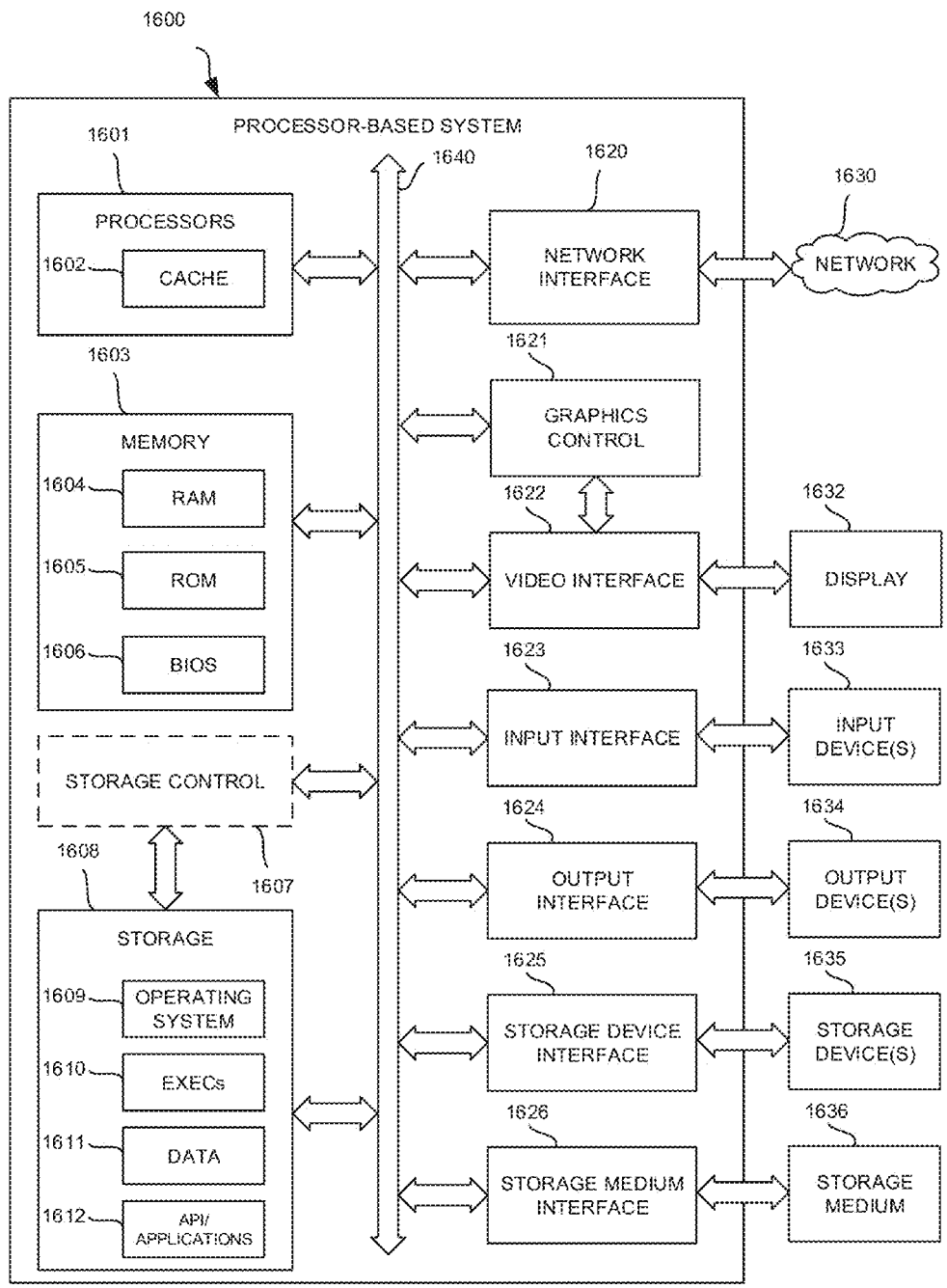
FIG. 16 is a flow chart depicting a method of the present disclosure.

The systems and methods described herein can be implemented in a machine such as a processor-based system in addition to the specific physical devices described herein. FIG. 16 shows a diagrammatic representation of one embodiment of a machine in the exemplary form of a processor-based system 1600 within which a set of instructions can execute for causing a device to perform or execute any one or more of the aspects and/or methodologies of the present disclosure. The components in FIG. 16 are examples only and do not limit the scope of use or functionality of any hardware, software, embedded logic component, or a combination of two or more such components implementing particular embodiments.

Processor-based system 1600 may include processors 1601, a memory 1603, and storage 1608 that communicate with each other, and with other components, via a bus 1640. The bus 1640 may also link a display 1632 (e.g., touch screen display), one or more input devices 1633 (which may, for example, include a keypad, a keyboard, a mouse, a stylus, etc.), one or more output devices 1634, one or more storage devices 1635, and various tangible storage media 1636. All of these elements may interface directly or via one or more interfaces or adaptors to the bus 1640. For instance, the various non-transitory tangible storage media 336 can interface with the bus 1640 via storage medium interface 1626. Processor-based system 1600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processors 1601 (or central processing unit(s) (CPU(s))) optionally contain a cache memory unit 1602 for temporary local storage of instructions, data, or computer addresses. Processor(s) 1601 are configured to assist in execution of processor-executable instructions. Processor-based system 1600 may provide functionality as a result of the processor(s) 1601 executing software embodied in one or more tangible, non-transitory processor-readable storage media, such as memory 1603, storage 1608, storage devices 1635, and/or storage medium 1636. The processor-readable media may store software that implements particular embodiments, and processor(s) 1601 may execute the software. Memory 1603 may read the software from one or more other processor-readable media (such as mass storage device(s) 1636, 1636) or from one or more other sources through a suitable interface, such as network interface 1620. The software may cause processor(s) 1601 to carry out one or more processes or one or more steps of one or more processes described or illustrated herein. Carrying out such processes or steps may include defining data structures stored in memory 1603 and modifying the data structures as directed by the software.

The memory 1603 may include various components (e.g., machine readable media) including, but not limited to, a random access memory component (e.g., RAM 1604) (e.g., a static RAM "SRAM", a dynamic RAM "DRAM, etc.), a read-only component (e.g., ROM 1605), and any combinations thereof. ROM 1605 may act to communicate data and instructions unidirectionally to processor(s) 301, and RAM 1604 may act to communicate data and instructions bidirectionally with processor(s) 1601. ROM 1605 and RAM 1604 may include any suitable tangible processor-readable media described below. In one example, a basic input/output system 1606 (BIOS), including basic routines that help to transfer information between elements within processor-based system 1600, such as during start-up, may be stored in the memory 1603.

Fixed storage 1608 is connected bidirectionally to processor(s) 1601, optionally through storage control unit 1607. Fixed storage 1608 provides additional data storage capacity and may also include any suitable tangible processor-readable media described herein. Storage 1608 may be used to store operating system 1609, EXECs 1610 (executables), data 1611, APV applications 1612 (application programs), and the like. Often, although not always, storage 1608 is a secondary storage medium (such as a hard disk) that is slower than primary storage (e.g., memory 1603). Storage 1608 can also include an optical disk drive, a solid-state memory device (e.g., flash-based systems), or a combination of any of the above. Information in storage 1608 may, in appropriate cases, be incorporated as virtual memory in memory 1603.

In one example, storage device(s) 1635 may be removably interfaced with processor-based system 1600 (e.g., via an external port connector (not shown)) via a storage device interface 1625. Particularly, storage device(s) 1635 and an associated machine-readable medium may provide nonvolatile and/or volatile storage of machine-readable instructions, data structures, program modules, and/or other data for the processor-based system 1600. In one example, software may reside, completely or partially, within a machine-readable medium on storage device(s) 1635. In another example, software may reside, completely or partially, within processor(s) 1601.

Bus 1640 connects a wide variety of subsystems. Herein, reference to a bus may encompass one or more digital signal lines serving a common function, where appropriate. Bus 1640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processor-based system 1600 may also include an input device 1633. In one example, a user of processor-based system 1600 may enter commands and/or other information into processor-based system 1600 via input device(s) 1633. Examples of an input device(s) 1633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1633 may be interfaced to bus 1640 via any of a variety of input interfaces 1623 (e.g., input interface 1623) including, but not limited to, serial, parallel, game port, USB, FIREWIRE, THUNDERBOLT, or any combination of the above.

In particular embodiments, when processor-based system 1600 is connected to network 1630, processor-based system 1600 may communicate with other devices, specifically mobile devices and enterprise systems, connected to network 1630. Communications to and from processor-based system 1600 may be sent through network interface 1620. For example, network interface 1620 may receive incoming communications (such as requests or responses from other devices) in the form of one or more packets (such as Internet Protocol (IP) packets) from network 1630, and processor-based system 1600 may store the incoming communications in memory 1603 for processing. Processor-based system 1600 may similarly store outgoing communications (such as requests or responses to other devices) in the form of one or more packets in memory 1603 and communicated to network 1630 from network interface 1620. Processor(s) 1601 may access these communication packets stored in memory 1603 for processing.

Examples of the network interface 1620 include, but are not limited to, a network interface card, a modem, and any combination thereof. Examples of a network 1630 or network segment 1630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1630, may employ a wired and/or a wireless mode of communication. In general, any network topology may be used.

Information and data can be displayed through a display 1632. Examples of a display 1632 include, but are not limited to, a liquid crystal display (LCD), an organic liquid crystal display (OLED), a cathode ray tube (CRT), a plasma display, and any combinations thereof. The display 1632 can interface to the processor(s) 1601, memory 1603, and fixed storage 1608, as well as other devices, such as input device(s) 1633, via the bus 1640. The display 1632 is linked to the bus 1640 via a video interface 1622, and transport of data between the display 1632 and the bus 1640 can be controlled via the graphics control 1621.

In addition to a display 1632, processor-based system 1600 may include one or more other peripheral output devices 1634 including, but not limited to, an audio speaker, a printer, and any combinations thereof. Such peripheral output devices may be connected to the bus 1640 via an output interface 1624. Examples of an output interface 1624 include, but are not limited to, a serial port, a parallel connection, a USB port, a FIREWIRE port, a THUNDERBOLT port, and any combinations thereof.

In addition or as an alternative, processor-based system 1600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, or hardware in connection with software. Various illustrative components, blocks, modules, circuits, and steps have been described above generally in terms of their functionality. Whether such functionality is implemented as hardware or hardware that utilizes software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for locating radio-frequency-emitting devices, the system comprising:
   a first software application on a locator device comprising:

a radio-frequency scanning component, and
a data utilities component;
a second software application that is downloadable on a personal communication device comprising:
the radio-frequency scanning component,
the data utilities component, and
a user interface;
a third software application located on a server remote from the locator device and the personal communication device, the system being configured to:
allow a user of the second software application to register a radio-frequency emitting device, thereby creating a registered trackable device,
detect the registered trackable device by the radio-frequency scanning component at either the first or second software application, wherein any instance of detecting constitutes a sighting of the registered trackable device,
determine when the sighting meets criteria defining the sighting as a new location of that registered trackable device utilizing the data utilities component locally at either the first or second software application,
wherein the criteria comprises each of:
whether the sighting is a first sighting of the registered trackable device,
an RSSI value,
an elapsed time since one or more of a plurality of previous sightings,
a difference in geographical distance from the one or more of the plurality of previous sightings, and
communicate, when the sighting of the registered trackable device meets the criteria, a report of the new location to the server, the report including the geographical location of the registered trackable device,
wherein each of:
the RSSI value,
the elapsed time since the one or more of the plurality of previous sightings, and
the geographical distance from the one or more of the plurality of previous sightings
has a threshold value that is configurable at the third software application on the server.

2. The system of claim 1, wherein the system is further configured to:
send a notification from the third software application on the server to either the first or second software application that a new location of the registered trackable device has occurred.

3. The system of claim 2, wherein:
the first software application detects the registered trackable device,
the registered trackable device is associated with the user of the second software application on the personal communication device,
the third software application on the server sends the notification to the second software application, and
the second software application displays a graphical payment interface to the user to allow the user to pay for the geographical location of the registered trackable device to be displayed to the user.

4. The system of claim 3, wherein the system is further configured to provide, when the user of the second software application pays money to have the geographical location of the registered trackable device displayed, at least a portion of the money to a user of the first software application.

5. The system of claim 1, wherein the system is further configured to:
determine whether the sighting of the registered trackable device meets the criteria defining the sighting as a new location by:
storing information about the sighting in a peripheral scan cache of the radio-frequency scanning component, the peripheral scan cache being configured to store a list of information for the plurality of previous sightings, and,
comparing the sighting to one or more of the plurality of previous sightings via the data utilities component.

6. The system of claim 5, wherein:
the plurality of sightings are associated with a particular registered trackable device and are stored in the peripheral scan cache, each of the plurality of sightings having an associated RSSI value, and the data utilities component is further configured to:
average the RSSI values of the plurality of sightings, and
compare an RSSI value of a new sighting to an average of the RSSI values of the plurality of sightings.

7. A method for locating radio-frequency-emitting devices, the method comprising:
registering, on a downloadable software application on a first locator device, a trackable device, thereby creating a registered trackable device, wherein the registered trackable device emits a radio frequency signal,
detecting, via a radio frequency scan conducted by a second locator device, a sighting of the registered trackable device,
determining, at the second locator device, whether the sighting of the registered trackable device meets criteria defining the sighting as a new location of that registered trackable device,
wherein the criteria comprises each of:
whether the sighting is a first sighting of the registered trackable device,
an RSSI value,
an elapsed time since one or more of a plurality of previous sightings,
a difference in geographical distance from the one or more of the plurality of previous sightings, and
wherein each of:
the RSSI value,
the elapsed time since the one or more of the plurality of previous sightings, and
the geographical distance from the one or more of the plurality of previous sightings
has a threshold value that is configurable on a software application located on a server,
communicating, when the sighting of the registered trackable device meets the criteria, a report of the new location to the server, the report including a geographical location of the registered trackable device, and
sending a notification from the server to the first locator device that a new location of the registered trackable device has occurred.

8. The method of claim 7, further comprising:
presenting, to a user of the first locator device the geographical location of the registered trackable device.

9. The method of claim 7, further comprising:
presenting, to the user of the first locator device, a graphical payment interface to allow the user to pay to obtain the geographical location of the registered trackable device,
providing, when the user of the first locator device pays money to obtain the geographical location of the registered trackable device, at least a portion of the money to a user of the second locator device.

10. The method of claim 7, wherein determining whether the sighting of the registered trackable device meets the criteria defining the sighting as a new location further comprises:
storing information about the sighting in a peripheral scan cache, the peripheral scan cache being configured to store a list of information for a plurality of previous sightings, and,
comparing the sighting to one or more previous sightings.

11. The method of claim 10, wherein a plurality of sightings of a particular registered trackable device are stored in the peripheral scan cache, each of the plurality of the sightings having an associated RSSI value, and further comprising:
averaging the RSSI values of the plurality of sightings, and
comparing an RSSI value of a new sighting to an average of the RSSI values of the plurality of sightings.

12. The method of claim 7, wherein one or more of the criteria are configurable by an administrator on the software application on the server.

13. A non-transitory, tangible computer readable storage medium, encoded with processor readable instructions to perform a method for locating radio-frequency-emitting devices, the method comprising:
registering, on a downloadable software application on a first locator device, a trackable device, thereby creating a registered trackable device, wherein the registered trackable device emits a radio frequency signal,
detecting, via a radio-frequency scan conducted by a second locator device, a sighting of the registered trackable device,
determining, at the second locator device, whether the sighting of the registered trackable device meets criteria defining the sighting as a new location of that registered trackable device,
wherein the criteria comprises each of:
whether the sighting is a first sighting of the registered trackable device,
an RSSI value,
an elapsed time since one or more of a plurality of previous sightings,
a difference in geographical distance from the one or more of the plurality of previous sightings, and
wherein each of:
the RSSI value,
the elapsed time since the one or more of the plurality of previous sightings, and
the geographical distance from the one or more of the plurality of previous sightings
has a threshold value that is configurable on a software application located on a server,
communicating, when the sighting of the registered trackable device meets the criteria, a report of the new location to the server, the report including a geographical location of the registered trackable device, and
sending a notification from the server to the first locator device that a new location of the registered trackable device has occurred.

14. The non-transitory, tangible computer readable storage medium of claim 13, wherein the method includes:
presenting, to the user of the first locator device the geographical location of the registered trackable device.

15. The non-transitory, tangible computer readable storage medium of claim 13, wherein determining whether the sighting of the registered trackable device meets the criteria defining the sighting as a new location further comprises:
storing information about the sighting in a peripheral scan cache, the peripheral scan cache being configured to store a list of information for a plurality of previous sightings, and
comparing the sighting to one or more previous sightings.

16. The non-transitory, tangible computer readable storage medium of claim 15, wherein a plurality of sightings of a particular registered trackable device are stored in the peripheral scan cache, each of the plurality of the sightings having an associated RSSI value, and further comprising:
averaging the RSSI values of the plurality of sightings, and
comparing an RSSI value of a new sighting to an average of the RSSI values of the plurality of sightings.

17. The non-transitory, tangible computer readable storage medium of claim 13, wherein one or more of the criteria are configurable by an administrator on the software application on the server.

* * * * *